United States Patent
Aoyama et al.

(10) Patent No.: US 6,560,189 B2
(45) Date of Patent: May 6, 2003

(54) OPTICAL INFORMATION STORAGE APPARATUS

(75) Inventors: Nobuhide Aoyama, Kawasaki (JP); Shin-ya Hasegawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 127 days.

(21) Appl. No.: 09/736,066

(22) Filed: Dec. 13, 2000

(65) Prior Publication Data

US 2001/0055263 A1 Dec. 27, 2001

(30) Foreign Application Priority Data

Feb. 18, 2000 (JP) ........................................ 2000-040849

(51) Int. Cl.⁷ .................................................. G11B 7/00
(52) U.S. Cl. .................................... 369/112.29; 369/118
(58) Field of Search ........................ 369/44.24, 112.01, 369/112.22, 112.23, 112.29, 118, 112.16, 112.17, 112.28

(56) References Cited

U.S. PATENT DOCUMENTS 4,682,315 A * 7/1987 Uejima ..................... 369/44.24

FOREIGN PATENT DOCUMENTS

| JP | 06-096485 | 4/1994 |
| JP | 06-302010 | 10/1994 |
| JP | 08-017065 | 1/1996 |
| JP | 11-134673 | 5/1999 |

* cited by examiner

Primary Examiner—Paul W. Huber
(74) Attorney, Agent, or Firm—Greer, Burns & Crain, Ltd.

(57) ABSTRACT

There is disclosed a compact optical information storage apparatus in which noise attributed to wobbling or the like is reduced and high-density recording is possible. An optical device 410 comprises a reflective surface 64 including a main portion for reflecting a signal light reflected by a separation surface 61 in a predetermined direction, and a mask portion 411 having an optical property different from the optical property of the main portion.

4 Claims, 19 Drawing Sheets

OPTICAL INFORMATION STORAGE APPARATUS

BACKGROUND OF THE INVENTION i) Field of the Invention

The present invention relates to an optical information storage apparatus for irradiating a predetermined optical information storage medium with light to access the medium, and an optical device for use in the optical information storage apparatus.

ii) Description of Related Art

An optical disk has been heretofore used as an optical information storage medium for recording/reproducing information such as voice, letter, and image in CD, CD-ROM, CD-R, DVD, PD, MO, MD, and the like. In the optical disk, the information is generally recorded in a band-like area surrounded with a concentric or spiral guide groove (track). Moreover, as an optical information storage apparatus for moving a condensing spot along the track of the optical information storage medium to access the information, apparatuses of various modes such as an installed type, car mounted type, and portable type have been developed. Particularly, MD is popular mainly among young people, and the sales of very compact portable apparatuses with sizes close to an optical disk jacket size are on the increase. Furthermore, as an exterior storage apparatus to be attached to a mobile personal computer (PC) or the like, development of the compact optical information storage apparatus has been expected.

In general, the optical information storage apparatus is provided with an optical head for forming a light spot on the optical disk track to access the information. Moreover, in order to develop the aforementioned compact optical information storage apparatus, an optical head has intensely been developed in which a laser diode (LD) as a light source, a beam splitter (BS), a photo detector for monitoring light outputs, an optical component and photo detector for detecting servo or RF signal, and further a preamplifier circuit are unified and integrated, and an optical device unified with the optical component of the optical head has also been intensely developed.

However, in such unified and integrated optical head, it is expected that noise attributed to fluctuation of the condensing spot during movement of the condensing spot along the track, or noise attributed to wobbling for indicating an information address or the like by meander of the track is generated. Therefore, it is desired that a compact optical information storage apparatus be realized by maintaining unity of the optical head and reducing the noise mixed in a reproducion signal.

SUMMARY OF THE INVENTION

The present invention has been developed in consideration of the aforementioned situations, and an object thereof is to provide a compact optical information storage apparatus in which a signal quality is high, reliability of signal reproduction is also high, and high-density recording is possible, and to provide a unified optical device for use in the optical information storage apparatus.

To achieve the object, according to the present invention, there is provided a first optical information storage apparatus comprising: a light source for emitting a light; an objective optical system for concentrating the light emitted from the light source to an optical information storage medium which generates a return light partially including a signal light in accordance with stored information, and for directing the return light from the optical information storage medium to a light source side; and an optical device, positioned between the light source and the objective optical system, for guiding the light emitted from the light source to the objective optical system, and separating the signal light from the return light reflected by the optical information storage medium and returned via the objective optical system.

The optical device comprises: a separation surface for transmitting the light emitted from the light source to the objective optical system, and reflecting the signal light to separate the signal light from the return light; and a reflective surface including a main portion for reflecting the signal light reflected by the separation surface in a predetermined direction, and a mask portion provided with an optical property different from the optical property of the main portion.

In the first optical information storage apparatus of the present invention, the mask portion may absorb the light, the mask portion may transmit the light, the mask portion may reflect the light in a direction different from the direction of reflection by the main portion, or the mask portion may reflect the light in the same direction as the direction of reflection by the main portion, and generate a phase difference different from the phase difference of the light generated during the reflection by the main portion.

Moreover, in the first optical information storage apparatus of the present invention, the mask portion is preferably provided with the optical property in accordance with a polarization direction.

Furthermore, in the first optical information storage apparatus of the present invention, the mask portion preferably has a band shape which is longitudinal in a direction corresponding to a width direction of the track formed in the optical information storage medium, and more preferably the mask portion is formed in two places apart from each other in the direction corresponding to the width direction of the track formed in the optical information storage medium.

Since the first optical information storage apparatus of the present invention is provided with the aforementioned mask portion, noise is reduced by a first principle described later. Moreover, since the optical device is provided with the reflective surface including the mask portion, it is easy to manufacture or design the aforementioned unified optical device, and the first optical information storage apparatus of the present invention can be realized as a compact apparatus.

When the mask portion absorbs the light, for the first optical information storage apparatus of the present invention, the reflective surface comprises the surface of the optical device, on which the signal light is incident from the inside of the optical device, and the mask portion is preferably constituted by attaching a light absorbing material to the outside of the optical device with respect to a predetermined portion of the reflective surface.

As the mask portion constituted by attaching the light absorbing material in this manner, a light absorbing pigment may be applied, or a tape-like light absorbing material may be bonded.

It is easy to produce the mask portion constituted by attaching the light absorbing material, which can reduce costs of the optical device and optical information storage apparatus.

Moreover, when the mask portion is formed by attaching the light absorbing material, the reflective surface preferably satisfies a total reflection condition.

When the reflective surface satisfies the total reflection condition, a light absorption effect by the light absorbing material is remarkable, and the reflective surface is particularly effective for noise reduction.

Moreover, when the mask portion transmits or reflects the light, in the first optical information storage apparatus of the present invention, the reflective surface comprises the surface of the optical device, on which the signal light is incident from the inside of the optical device, and the mask portion preferably comprises a concave portion or a convex portion disposed on the predetermined portion of the reflective surface.

The mask portion comprising the concave portion or the convex portion can easily be formed by glass molding, which can reduce the costs of the optical device and optical information storage apparatus.

Furthermore, when the mask portion generates a phase difference different from the phase difference of the light generated during reflection in the main portion, in the first optical information storage apparatus of the present invention, the reflective surface comprises the surface of the optical device, on which the signal light is incident from the inside of the optical device, and the mask portion is preferably constituted by forming a dielectric film on the outside of the optical device with respect to a predetermined portion of the reflective surface.

The mask portion with the dielectric film formed thereon is also easily produced, which can reduce the costs of the optical device and optical information storage apparatus.

To achieve the object, according to the present invention, there is provided a second optical information storage apparatus comprising: a light source for emitting a light; an objective optical system for concentrating the light emitted from the light source to an optical information storage medium which generates a return light partially including a signal light in accordance with stored information, and for directing the return light from the optical information storage medium to a light source side; and an optical device, positioned between the light source and the objective optical system, for guiding the light emitted from the light source to the objective optical system, and separating the signal light from the return light reflected by the optical information storage medium and returned via the objective optical system.

The optical device comprises: a separation surface for transmitting the light emitted from the light source to the objective optical system, and reflecting the signal light to separate the signal light from the return light; a reflective surface for reflecting the signal light reflected by the separation surface in a predetermined direction; and a shielding material for shielding a predetermined portion of a flux of the light reflected by the reflective surface.

In the second optical information storage apparatus of the present invention, the shielding material may absorb the light of the predetermined portion, the shielding material may reflect the light of the predetermined portion, or the shielding material may refract the light of the predetermined portion.

Moreover, in the second optical information storage apparatus of the present invention, the shielding material preferably has a band shape which is longitudinal in a direction corresponding to a transverse direction of the track formed in the optical information storage medium, and more preferably the shielding material is formed in two places apart from each other in the direction corresponding to the transverse direction of the track formed in the optical information storage medium.

In the second optical information storage apparatus of the present invention, since the optical device comprises the shielding material provided with a function similar to the function of the mask portion in the first optical information storage apparatus, the noise is reduced in accordance with the first principle described later even in the second optical information storage apparatus. Moreover, since it is also easy to manufacture and design the optical device including the shielding material as the aforementioned unified optical device, and the second optical information storage apparatus of the present invention can also be realized as the compact apparatus.

To achieve the object, according to the present invention, there is provided a third optical information storage apparatus comprising: a light source for emitting a light; an objective optical system for concentrating the light emitted from the light source to an optical information storage medium which generates a return light partially including a signal light in accordance with stored information, and for directing the return light from the optical information storage medium to a light source side; and an optical device, positioned between the light source and the objective optical system, for guiding the light emitted from the light source to the objective optical system, and separating the signal light from the return light reflected by the optical information storage medium and returned via the objective optical system.

The optical device comprises: a separation surface for transmitting the light emitted from the light source to the objective optical system, and reflecting the signal light to separate the signal light from the return light; and a reflective surface for reflecting the signal light reflected by the separation surface in a predetermined direction, and the separation surface and the reflective surface produce a phase difference within ±15° in total as a result of reflection by the separation surface and the reflective surface.

In the third optical information storage apparatus of the present invention, the separation surface and the reflective surface produce a phase difference within ±10° in total as a result of reflection by the separation surface and the reflective surface.

According to the third optical information storage apparatus of the present invention, since the phase difference is produced, the noise is reduced by a second principle described later. Moreover, since it is also easy to manufacture and design the optical device which produces such phase difference as the aforementioned unified optical device, the third optical information storage apparatus of the present invention can also be realized as the compact apparatus.

In the first, second, and third optical information storage apparatus of the present invention, the separation surface is preferably a secondary curved surface for transmitting the light emitted from the light source to a concave surface side from a concave surface side and guiding the light to the objective optical system, and particularly the separation surface is preferably a surface comprising a part of a cylindrical surface for transmitting the light emitted from the light source to the concave surface side from the concave surface side and guiding the light to the objective optical system.

Since the separation surface of the secondary curved surface or the cylindrical surface can inhibit generation of the noise as compared with a flat separation surface, the noise reduction in the optical information storage apparatus of the present invention can further be enhanced.

To achieve the aforementioned object, according to the present invention, there is provided a first optical device comprising: a separation surface for reflecting a light having a predetermined property to separate the light of the predetermined property from a light partially including the light of the predetermined property; and a reflective surface including a main portion for reflecting the light, reflected by the separation surface, in a predetermined direction, and a mask portion having an optical property different from the optical property of the main portion.

Moreover, to achieve the aforementioned object, according to the present invention, there is provided a second optical device comprising: a separation surface for reflecting a light having a predetermined property to separate the light of the predetermined property from a light partially including the light of the predetermined property; a reflective surface for reflecting the light, reflected by the separation surface, in a predetermined direction; and a shielding material for shielding a predetermined portion of a flux of the light reflected by the separation surface.

Furthermore, to achieve the aforementioned object, according to the present invention, there is provided a third optical device comprising: a separation surface for reflecting a light having a predetermined property to separate the light of the predetermined property from a light partially including the light of the predetermined property; and a reflective surface for reflecting the light, reflected by the separation surface, in a predetermined direction, and the separation surface and the reflective surface produce a phase difference within ±15° in total as a result of reflection by the separation surface and the reflective surface.

Additionally, for the optical device of the present invention, only a basic mode will be described here, this simply avoids redundancy, and the optical device of the present invention includes not only the optical device of the aforementioned basic mode but also various modes of optical devices for respective modes of the aforementioned optical information storage apparatuses.

DETAILED DESCRIPTION OF THE PREFERRED EMBODIMENTS

Preferred embodiments of the present invention will be described hereinafter. After describing comparative examples, concrete embodiments of the present invention will then be described.

Figure 1:
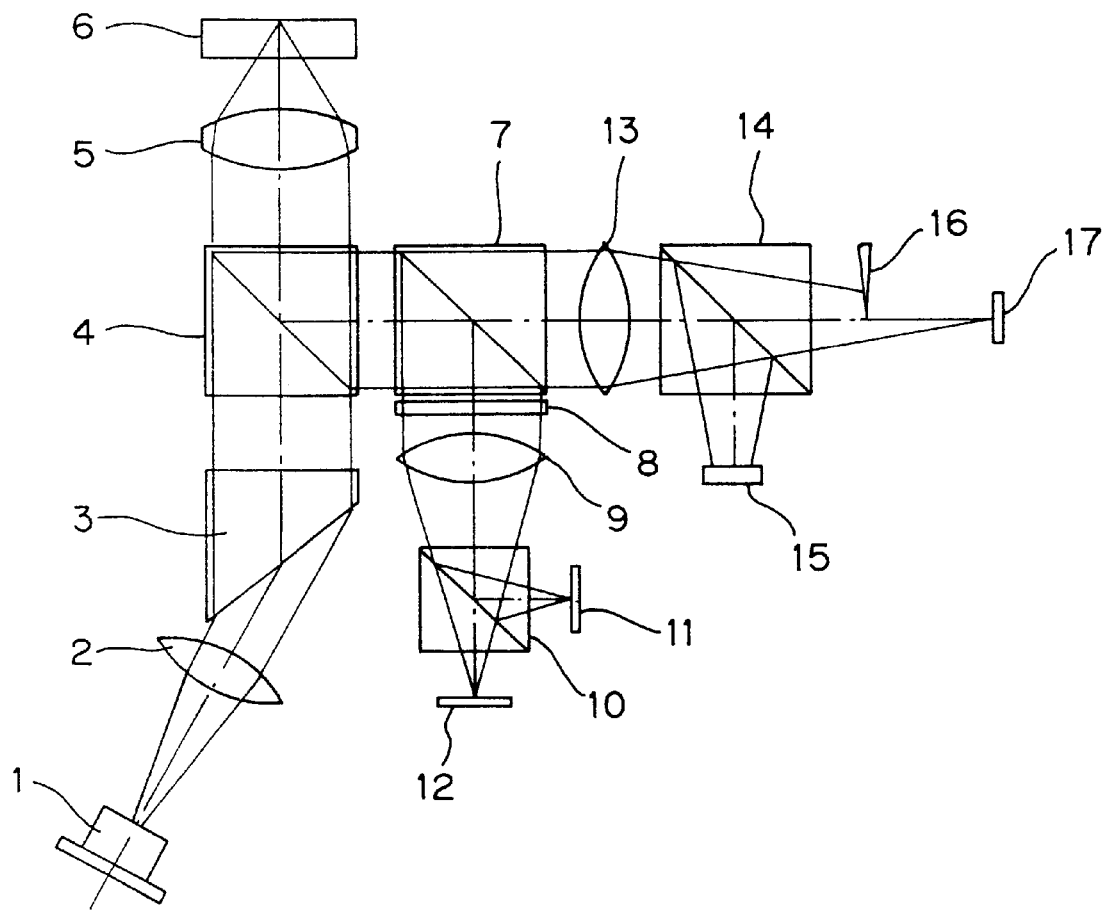
FIG. 1 is a diagram showing an optical head incorporated in a first comparative example of an optical information storage apparatus.

FIG. 1 is a diagram showing an optical head incorporated in a first comparative example of an optical information storage apparatus.

The optical head is premised on a magnetooptic (MO) disk 6 as an optical information storage medium.

The optical head is provided with a laser diode 1 as a light source, and the laser diode 1 emits a polarized emanant light as a light flux with an elliptical section. The emanant light emitted from the laser diode 1 is converted to a parallel light by a collimator lens 2, and the light flux is shaped in a beam shaping prism 3 to provide a circular section.

The shaped parallel light flux is incident on a polarizing beam splitter 4, passed through a separation surface and condensed onto a track of the magnetooptic disk 6 by an objective lens 5. During information writing, an upward or downward magnetic pole in accordance with writing information is formed in a position of an irradiation light on the magnetooptic disk 6 by heat of the irradiation light, or an external magnetic field generated by a magnetic head (not shown), and the information is stored in a form of binary data. On the other hand, during information reading, the magnetooptic disk 6 with the magnetic pole formed thereon is irradiated with the irradiation light, the light is reflected by the magnetooptic disk and a reflected light (return light) is generated. When the light is reflected, a polarization direction is rotated in a direction (+ direction or − direction) in accordance with a magnetic pole direction by a predetermined slight angle by Kerr effect.

The reflected light (return light) by the magnetooptic disk 6 returns to the first polarizing beam splitter 4 via the objective lens 5, and is reflected by the separation surface. Among the light reflected by the separation surface of the beam splitter 4, the light of a predetermined ratio is further reflected by the separation surface of a second polarizing beam splitter 7, the polarization direction is rotated by 45° by a $\lambda/2$ plate 8, and the light is focused by a first focusing lens 9. Thereafter, the light is divided to polarized components crossing at right angles to each other by a third polarizing beam splitter 10, respective separated components are detected by photo detectors 11, 12 and a differential signal is obtained as an intensity difference of the respective components. Therefore, a binary signal (MO signal) is detected in accordance with binary data stored in the magnetooptic disk 6.

Moreover, a part of the light reflected by the first polarizing beam splitter 4 is transmitted through the separation surface of the second polarizing beam splitter 7, and converged by a second condensing lens 13. Subsequently, the converged light is divided into two by a half prism 14, one of two divided lights is reflected by the half prism 14, and the other is transmitted through the half prism 14. The light reflected by the half prism 14 is used in tracking detection by a photo detector 15, and the light transmitted through the half prism 14 is used in focus detection by a knife edge 16 and photo detector 17. Detection results of the tracking detection and focus detection are fed back to an actuator (not shown) for adjusting the position of the objective lens 5, and the position of the objective lens 5 is adjusted.

As described above, many optical devices are necessary in the optical head of the first comparative example. Therefore, there arise problems that the number of preparation processes or adjustment processes is large and manufacture cost is high, stability of an optical system is low, and that size of the optical head or the optical information storage apparatus is large.

In a second comparative example, there is provided an optical information storage apparatus incorporating the optical head to solve the problem of the optical head shown in FIG. 1.

The light source of an optical head 20 is a laser diode 21, and the laser diode 21 emits a linearly polarized laser light as a mode of emanant light. The polarization direction of the laser light is an in-plane direction of FIG. 2. Moreover, the optical information storage medium on which the optical head 20 is premised is also a magnetooptic disk (MO) 40.

The optical head 20 is provided with an optical device 30, and the optical device 30 is constituted by unifying the polarizing beam splitter including a flat separation surface 31, a reflection prism including a reflective surface 32, a servo detecting hologram 33, and Wollaston prism 34. Therefore, the number of optical devices constituting the optical head 20 is small, and stability of the optical system is high. Moreover, the optical device 30 is disposed in a position sufficiently close to the laser diode 21, and supported by a cap 28, in the position the laser light flux is sufficiently small, and the optical device 30 is also sufficiently small in size. Therefore, miniaturization of the optical head 20 is realized.

The laser light emitted from the laser diode 21 is reflected by a raising mirror 22, incident on the optical device 30, transmitted through the servo detecting hologram 33 of the optical device 30, directed to the separation surface 31, and incident on the separation surface 31 at an angle of about 45°. The separation surface is constituted by a so-called polarizing film.

A part of the light transmitted through the servo detecting hologram 33 and directed to the separation surface 31 is reflected by the separation surface 31 and incident on a light quantity monitoring photo detector 23. Moreover, a light quantity is detected by the light quantity monitoring photo detector 23, and a detection result of the light quantity is fed back to the laser diode 21, so that a laser output of the laser diode 21 is controlled.

Much of the light transmitted through the servo detecting hologram 33 and directed to the separation surface 31 is transmitted through the separation surface 31 and guided to a collimator lens 24. The light guided to the collimator lens 24 is converted to a parallel light by the collimator lens 24, and condensed to the magnetooptic disk 40 by an objective lens 25 for irradiation. The information is binarized and stored in the magnetooptic disk 40, and the polarization direction of the light condensed to the magnetooptic disk for irradiation is rotated by the predetermined slight angle in a direction in accordance with a value indicating the information (+ direction or − direction) by Kerr effect.

The light reflected by the magnetooptic disk 40 returns to the optical device 30 via the objective lens and collimator lens 24. Among the returned light, a component of the same polarization direction as the polarization direction of the emanant light from the laser diode 21 is transmitted to the servo detecting hologram 33 at a predetermined transmittance. Moreover, the light incident on the servo detecting hologram 33 is split/condensed to respective servo detecting photo detectors 26 by the servo detecting hologram 33, and used in focus detection or tracking detection by the respective servo detecting photo detectors 26.

Moreover, among the light reflected and returned by the magnetooptic disk 40, the separation surface 31 of the optical device 30 reflects substantially 100% of a component of the polarization direction crossing at right angles to the polarization direction of the emanant light from the laser diode 21, and a part of the component of the same polarization direction as the polarization direction of the emanant light. Therefore, during reflection by the magnetooptic disk 40, an effect of rotation of the polarization direction is amplified by Kerr effect. From a different viewpoint, the component of the rotated polarization direction is separated as the signal light by Kerr effect.

The light reflected by the separation surface 31 is totally reflected by the separation surface 32 parallel to the separation surface 31, incident on the Wollaston prism 34, and separated to a normal ray and an abnormal ray. A light quantity of the normal ray to the abnormal ray is substantially constant regardless of a + polarization direction or a − polarization direction, and a magnitude relation of the light quantity is reversed depending upon the + polarization direction or the − polarization direction by the Kerr effect. Two rays separated by the Wollaston prism 34 are detected by respective signal detecting photo detectors 27, the respective light quantities are obtained, and the MO signal is detected by differential of these signal detecting photo detectors 27.

Additionally, for the light incident on the separation surface 31, the emanant light is incident from the laser diode 21, or the converged light is incident from the magnetooptic disk 40. Therefore, distribution is generated in an incident angle to the separation surface 31.

For a conventional apparatus, since a portable drive apparatus exclusive for reproduction mainly including MD is a mainstream, an aperture of the light from the laser diode as the light source is limited to about NA=0.1, and the incident angle distribution is minimized. However, in recent years, a demand for recording of the information at a high speed has increased, and in order to increase the light quantity taken from the laser diode, the aperture needs to be increased to about NA=0.2. As a result, the incident angle of the light incident on the separation surface probably exceeds an angle range in which a polarization property of a polarization film constituting the separation surface is guaranteed.

Therefore, there is proposed a technique of employing the separation surface constituted by a part of a cylindrical surface, reducing the incident angle distribution to the polarization film to enhance the polarization property, and improving an information recording reproduction ability. In a third comparative example described hereinafter, the separation surface constituted of a part of the cylindrical surface is employed.

Figure 3:
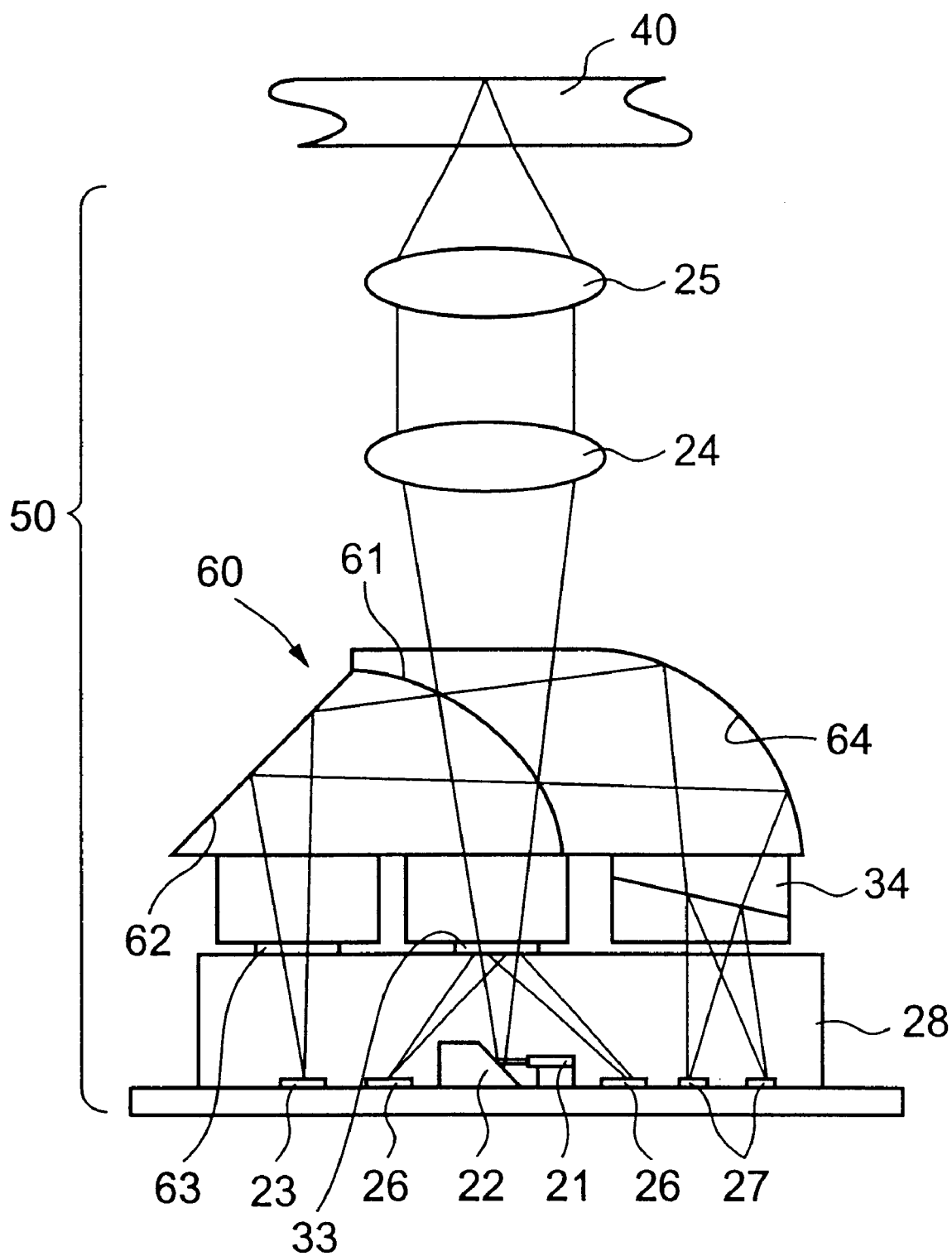
FIG. 3 is a diagram showing the optical head incorporated in a third comparative example of the optical information storage apparatus.

FIG. 3 is a diagram showing the optical head incorporated in the third comparative example.

Figure 2:
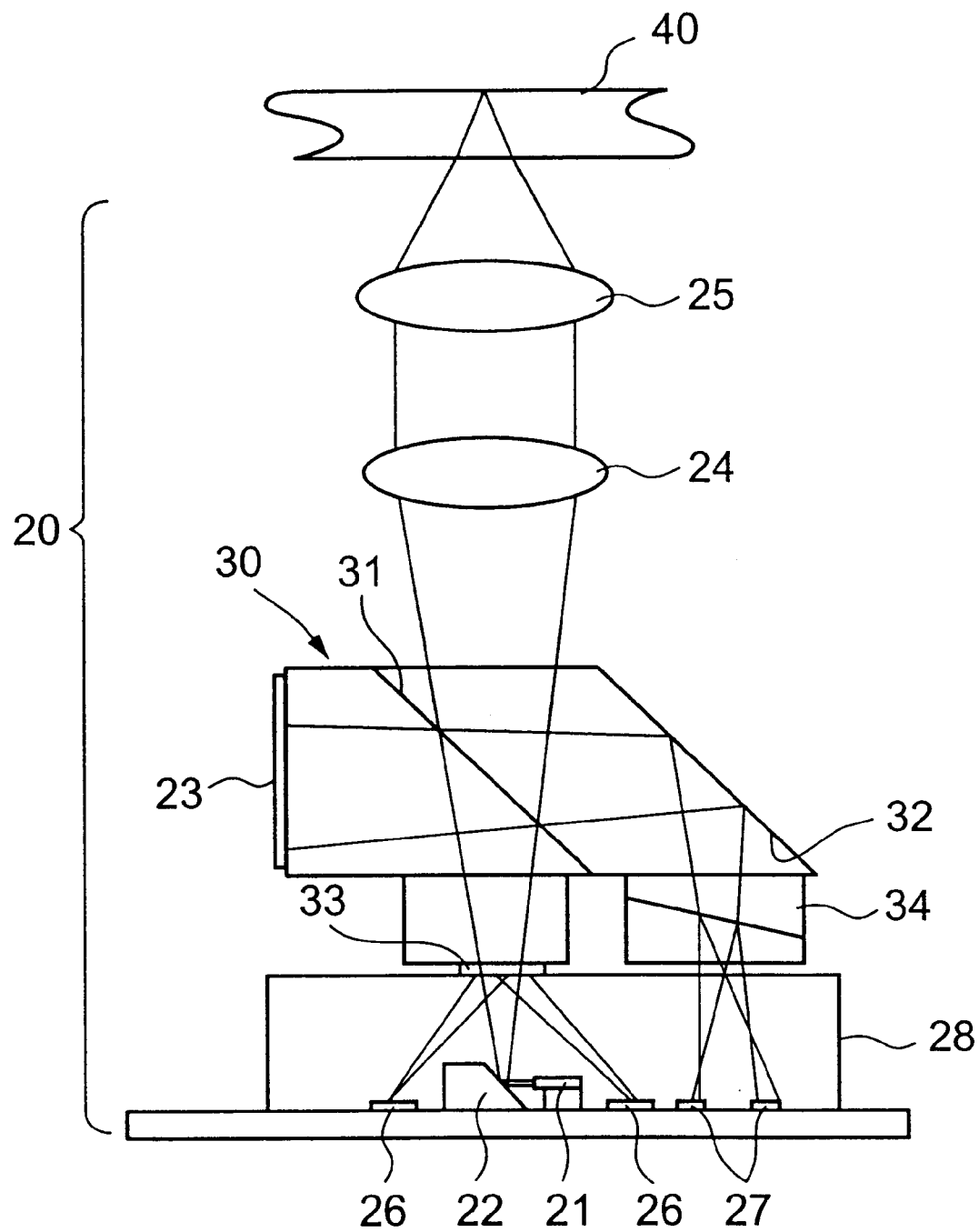
FIG. 2 is a diagram showing the optical head incorporated in a second comparative example of the optical information storage apparatus.

For components constituting an optical head 50 shown in FIG. 3, the constituting components equal to the constituting components of the optical head 20 shown in FIG. 2 are denoted by the same reference numerals as the numerals attached to the constituting components, and the description thereof is omitted.

An optical device 60 of the optical head 50 shown in FIG. 3 is provided with a separation surface 61 formed by a part of the cylindrical surface, and the incident angle of the light incident on the separation surface 61 is within a small incident angle range centering on 45°. Therefore, a desired polarization property is fulfilled in the separation surface 61, and the optical device 60 has a high ability to separate the signal light.

A part of the light incident on the separation surface 61 from the laser diode 21 is reflected by the separation surface 61, reflected by an inclined surface 62, and concentrated on the light quantity monitoring photo detector 23 by a light quantity monitoring hologram 63 so that the light quantity is detected.

Moreover, similarly as the description with reference to FIG. 2, a predetermined component of the light incident on the separation surface 61 from the magnetooptic disk 40 is reflected by the separation surface 61. Thereafter, the light is totally reflected and converged by a separation surface 64 having substantially the same curvature as the curvature of the separation surface 61, incident on the Wollaston prism 34 and separated to two rays, and detected by the respective signal detecting photo detectors 27, and the MO signal is detected by the differential of these signal detecting photo detectors 27.

By employing the separation surface formed of the part of the cylindrical surface, the incident angle distribution is minimized. However, when the emanant light or the converged light is incident on the separation surface, distribution of an advancing direction of the incident light is also generated, and such advancing direction distribution results in deterioration of a signal noise (SN) ratio as described below. Particularly, among the optical information storage apparatuses, in the apparatuses such as MO in which a signal intensity is sensitive to a change of the polarization direction of the signal light, the deterioration of the SN ratio attributed to the advancing direction distribution is large, and a countermeasure is necessary.

The SN ratio deterioration attributed to the aforementioned advancing direction distribution will be described hereinafter.

Figure 4:
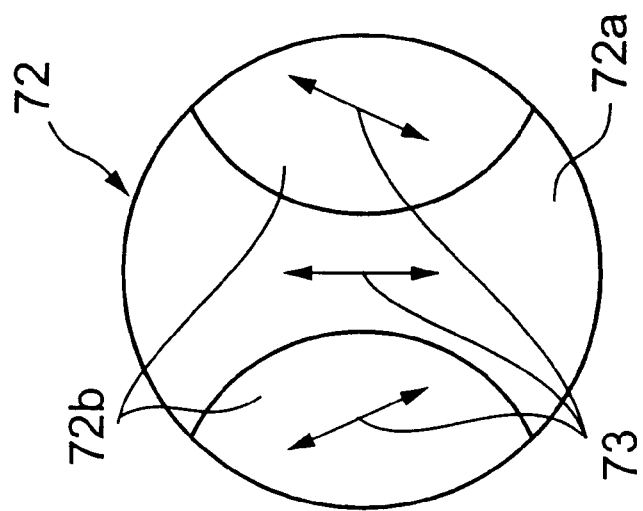
FIGS. 4A and 4B are diagrams showing a distribution state of an advancing direction.
Figure 4:
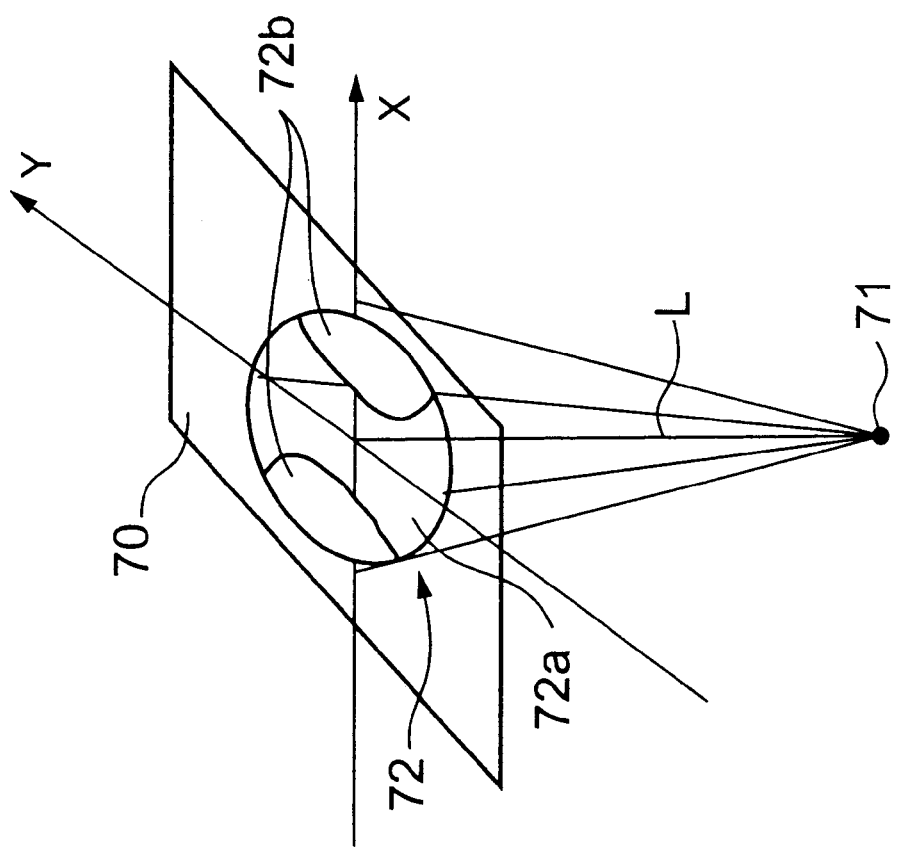

FIG. 4 shows diagrams of an advancing direction distribution state.

FIG. 4A shows a plane 70 corresponding to the separation surface, and a light source 71. The emanant light emitted from the light source 71 spreads in directions X and Y as shown by arrows in FIG. 4A, and is incident on the plane 70 at an incident angle of about 45°. FIGS. 4A and 4B show a circular section 72 of an emanant light flux in the plane 70.

Here, it is assumed that projection of a center line L of the emanant light flux to the plane 70 overlaps with the arrow indicating the direction Y, and the light emitted from the light source 71 is polarized in a direction in a plane including the center line L and the arrow indicating the direction Y. Moreover, the plane 70 is provided with the polarization property of reflecting the polarized component (so-called S-polarized component) in the in-plane direction, and transmitting a P-polarized component whose polarization direction crosses at right angles to the S-polarized component. This polarization property is a general property of the polarization film.

FIG. 4B shows polarization directions 73 of the light transmitted through the plane 70, and for these polarization directions 73, as described hereinafter, a distribution is generated by the polarization property of the plane 70. For the light incident on the plane 70, the polarization direction of the S-polarized component reflected by the plane 70 corresponds to the in-plane direction of the plane 70, and crosses at right angles to the incident direction of the light. Therefore, for the section 72 of the emanant light flux, in a middle area 72a in the vicinity of the arrow indicating the direction Y, the polarization direction of the S-polarized component is substantially a direction X. Therefore, the polarization direction 73 of the transmitted light in the middle area 72a is hardly different from an inherent polarization direction of the light emitted from the light source 71. On the other hand, for the section 72 of the emanant light flux, in a side area 72b apart from the arrow indicating the direction Y, the polarization direction of the S-polarized component is inclined from the direction X in accordance with the spread of the emanant light flux, and as a result, the polarization direction 73 of the transmitted light in the side area 72b is inclined from the direction Y which is the inherent polarization direction. Specifically, when the light emitted from the light source 71 is transmitted through the plane 70, the polarization direction rotates in the side area 72b and, as a result, a distribution is generated in the polarization direction in the light section 72. Moreover, the distribution of the polarization direction is similarly generated in a condensing spot on the optical information storage medium. In the following description, the middle area 72a and side area 72b in the emanant light flux section 72 are used without being distinguished from the areas in the condensing spot corresponding to the middle area 72a and side area 72b.

Figure 5:
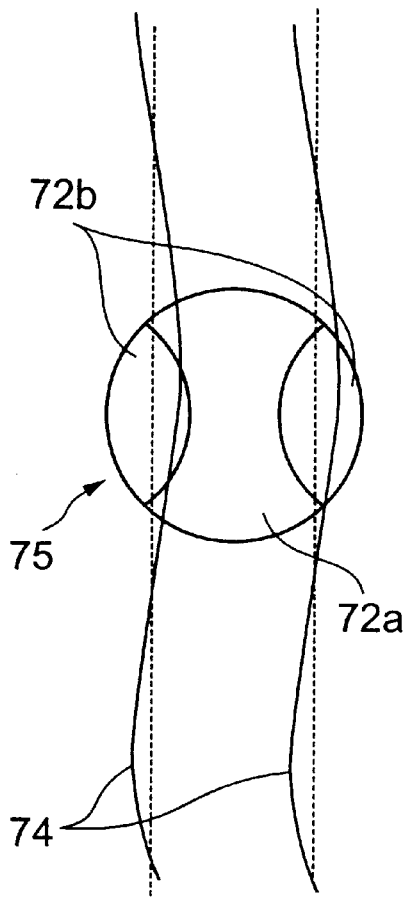
FIGS. 5A and 5B are diagrams showing a condensing spot on an optical information storage medium.
Figure 5:
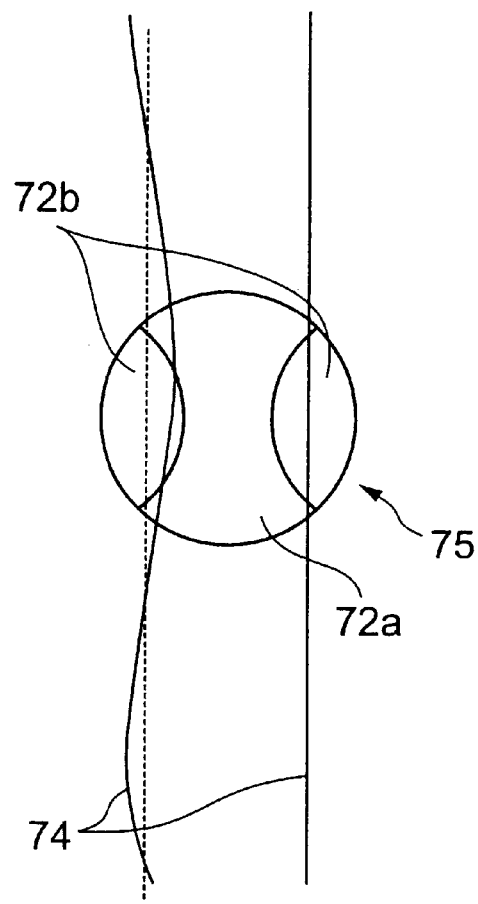

FIG. 5 shows diagrams of the condensing spot on the optical information storage medium.

In the usual optical information storage apparatus, an optical arrangement is employed in which the direction Y shown in FIG. 4 corresponds to a length direction (vertical direction of FIG. 5) of a track 74 of the optical information storage medium, and tracking servo is executed in such a manner that a condensing spot 75 moves between and along two tracks 74. As a result, two side areas 72b follow the two tracks 74, respectively. In this manner, when the side area 72b follows the track 74, a light diffracted by the track 74 is mixed in the light reflected by the optical information storage medium. In a band in which a servo gain of a tracking servo is small, the condensing spot 75 wobbles in a direction crossing across the track 74, with the wobbling of the condensing spot 75, deviation is generated between the diffracted light quantities of two tracks 74, and in consideration of the entire condensing spot 75, rotation occurs in the polarization direction of the reflected light (return light). The polarization rotation is independent of recording information, but similarly as the inherent polarization rotation in accordance with the recording information, the rotation is detected as a differential signal of the signal detecting photo detector and a noise signal is generated.

Furthermore, in MD or the like, a wobble track is formed as described later, and deterioration of the SN ratio by the noise attributed to the wobble track occurs.

FIG. 5A shows that both the tracks 74 holding the condensing spot 75 therebetween are wobble tracks described later, and FIG. 5B shows that one of two tracks 74 holding the condensing spot 75 therebetween is a wobble track. A format of such one-side wobble has been developed in recent years in order to realize high-density recording by land group recording.

In the wobble track, meander is formed in a band higher than the band in which the tracking servo is effective, and the meander indicates ID information corresponding to an address of the information indicating an image, sentence, or the like. Since the tracking servo cannot follow the meander in this high band, the condensing spot 75 relatively wobbles in the direction crossing across the track 74, and a reflected light quantity fluctuates in accordance with the meander of the track 74. The ID information is detected by detecting the fluctuation of the reflected light quantity.

Inherently, the ID information is detected only by a light quantity change, and during detection of the MO signal based on the polarization rotation, no ID information must be detected, but as described above, the polarization direction in the side area 72b is different from that of the middle area 72a, the wobbling of the condensing spot 75 attributed to the wobble track causes the polarization rotation in the reflected light (return light), and during detection of the MO signal the ID information signal leaks in to form the noise signal.

Figure 6:
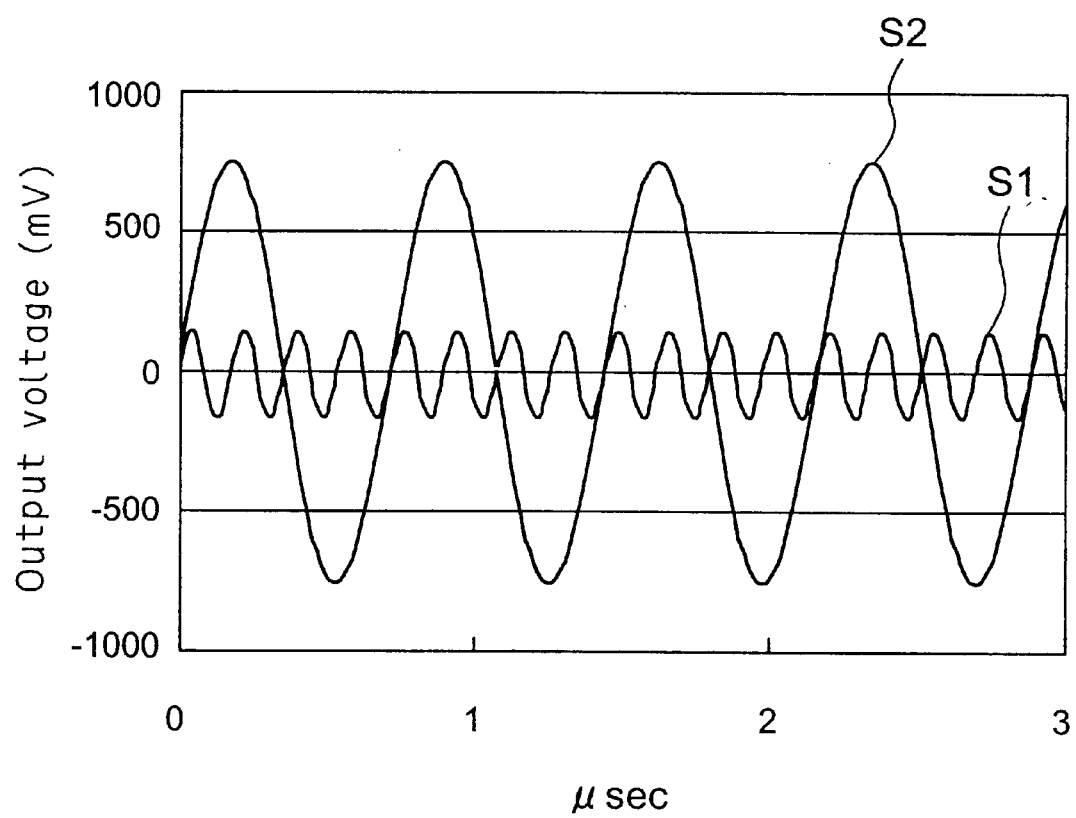
FIG. 6 is a graph of comparison of an MO signal with a noise signal.

FIG. 6 is a graph of comparison of the MO signal with the noise signal.

The ordinate of the graph indicates an output voltage of the differential signal of the signal detecting photo detector, and the abscissa indicates time.

A short-period signal is an MO signal S1 in accordance with a so-called 2T pattern which is a shortest mark recorded in the optical information storage medium, and a long-period signal is a noise signal S2 when the condensing spot completely crosses the track. Since a magnitude of amplitude of the noise signal S2 is several times that of the amplitude of the MO signal S1, even by a slight wobbling of the condensing spot with respect to the track, a large noise is produced and the SN ratio is considerably lowered.

A concrete embodiment of the present invention will be described hereinafter.

Figure 7:
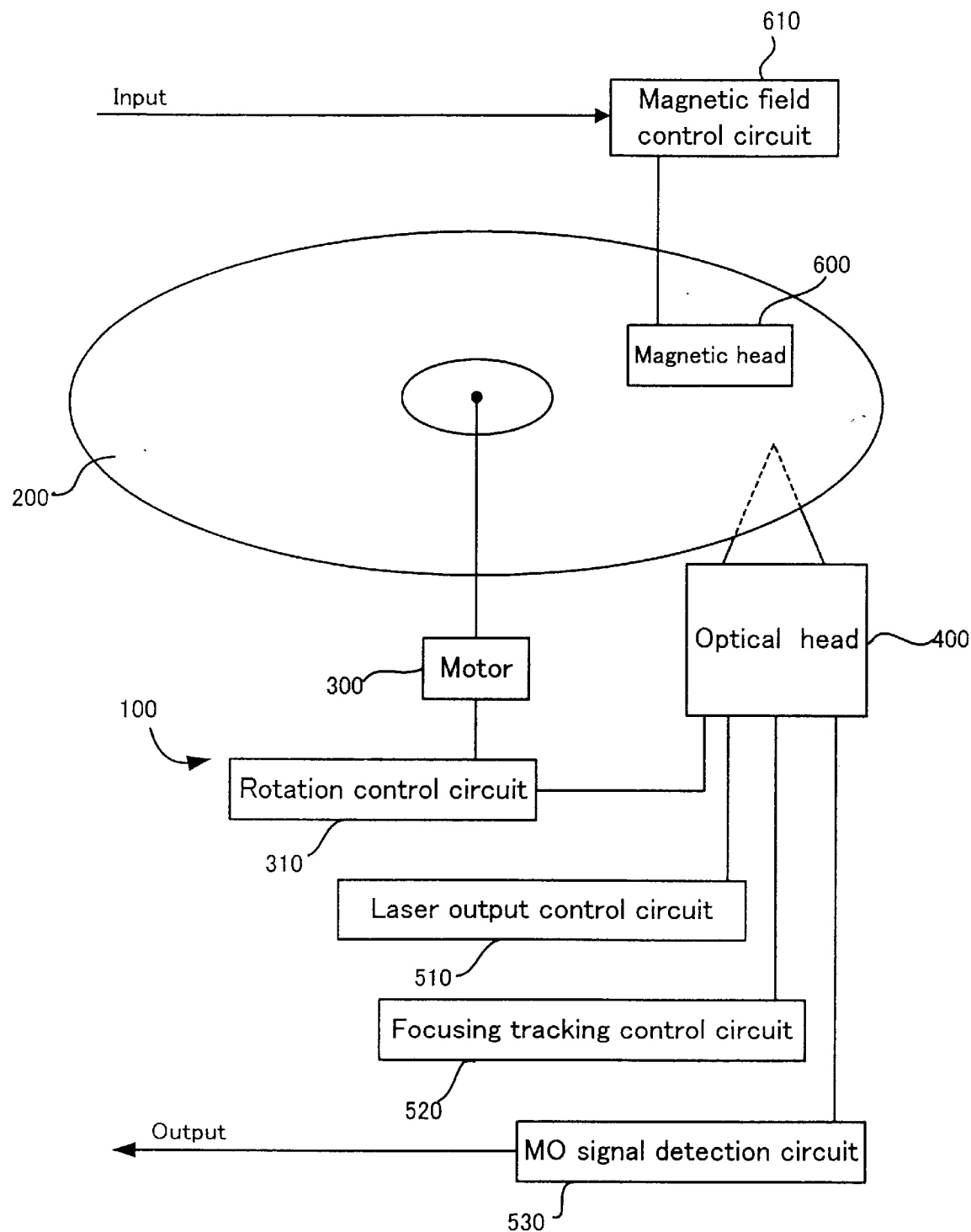
FIG. 7 is a diagram showing one embodiment of the optical information storage apparatus of the present invention.

FIG. 7 is a diagram showing one embodiment of the optical information storage apparatus of the present invention.

An optical information storage apparatus 100 is provided with a motor 300 for holding and rotating a magnetooptic disk 200 as one example of the optical information storage medium, and a rotation control circuit 310 for controlling motor rotation. Additionally, it is known to those skilled in the art that the optical information storage medium of the present invention is not limited to the magnetooptic disk, and a phase change type disk can also be used. In the following description, it is assumed that the magnetooptic disk 200 is employed as the optical information storage medium.

Moreover, the optical information storage apparatus 100 is provided with an optical head 400 for concentrating a laser light on the magnetooptic disk 200 for irradiation, a laser output control circuit 510 for controlling a laser light output, and a focus tracking control circuit 520 for controlling focus and tracking of the irradiation light with which the magnetooptic disk 200 is irradiated by the optical head 400.

Furthermore, the optical information storage apparatus 100 is provided with a magnetic head 600, and a magnetic field control circuit 610, and during information writing, the magnetic head 600 adds an external magnetic field to a position in which the irradiation light is concentrated on the magnetooptic disk 200 by the optical head 400, and the magnetic field control circuit 610 controls intensity, direction, and the like of the external magnetic field in accordance with an input signal indicating writing information written in the magnetooptic disk 200. Moreover, the writing information is written by heat of the irradiation light by the optical head 400, and the external magnetic field by the magnetic head 600.

Furthermore, the optical information storage apparatus 100 is provided with an MO signal detection circuit 530, and during information reproduction, the MO signal indicating the information stored in the magnetooptic (MO) disk 200 is detected and outputted by the MO signal detection circuit 530.

Figure 8:
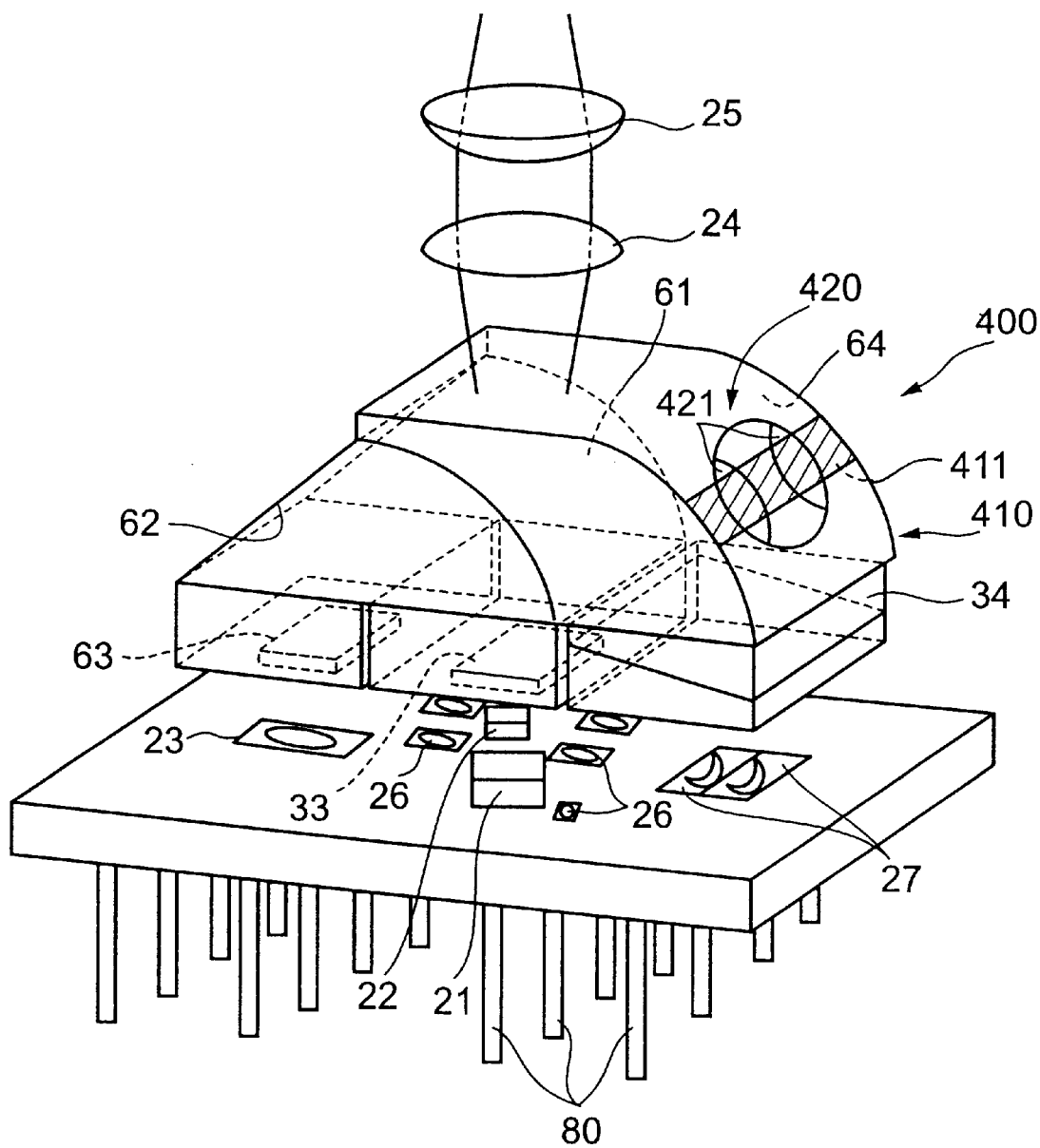
FIG. 8 is a perspective view of the optical head incorporating one embodiment of an optical device of the present invention.

FIG. 8 is a perspective view of the optical head shown by one square in FIG. 7, and this optical head incorporates one embodiment of the optical device of the present invention.

For the components constituting the optical head 400 shown in FIG. 8, the constituting components equal to the constituting components of the optical head 50 shown in FIG. 3 are denoted by the same reference numerals, and the description thereof is omitted.

An optical device 410 shown in FIG. 8 is characterized in that a mask portion 411 is formed in a portion shown by slant lines in the reflective surface 64, and here the mask portion 411 is formed as a light absorbing band-like portion. A portion other than the mask portion 411 of the reflective surface 64 corresponds to a main portion referred to in the present invention. Moreover, in FIG. 8, a light 420 reflected by the separation surface 61 to reach the reflective surface 64 is shown by a circle, and for the light 420, two portions 421 including a diffracted light attributed to the track 74 shown in FIG. 5 are also shown. A state of the light 420 provided with two portions 421 will be hereinafter referred to as "ball shape". A direction passed through two portions 421 including the diffracted light corresponds to the direction crossing the track 74 shown in FIG. 5, and the mask portion 411 is formed as a band-like portion longitudinal in this direction. By forming the mask portion 411, noise is reduced in accordance with a principle described later. Moreover, since the noise reduction is realized by forming the mask portion 411, advantages of the optical device 410 that a large number of devices are unified in a compact manner and that the structure is easily manufactured are maintained, and largely contribute to realization of a compact and low-cost optical information storage apparatus.

A method of preparing the mask portion 411, and variation of the mask portion referred to in the present invention will be described later.

The collimator lens 24 and objective lens 25 constitute an objective optical system referred to in the present invention. Moreover, FIG. 8 shows a large number of terminals 80, and the photo detector is connected to a preamplifier circuit via these terminals 80.

Figure 9:
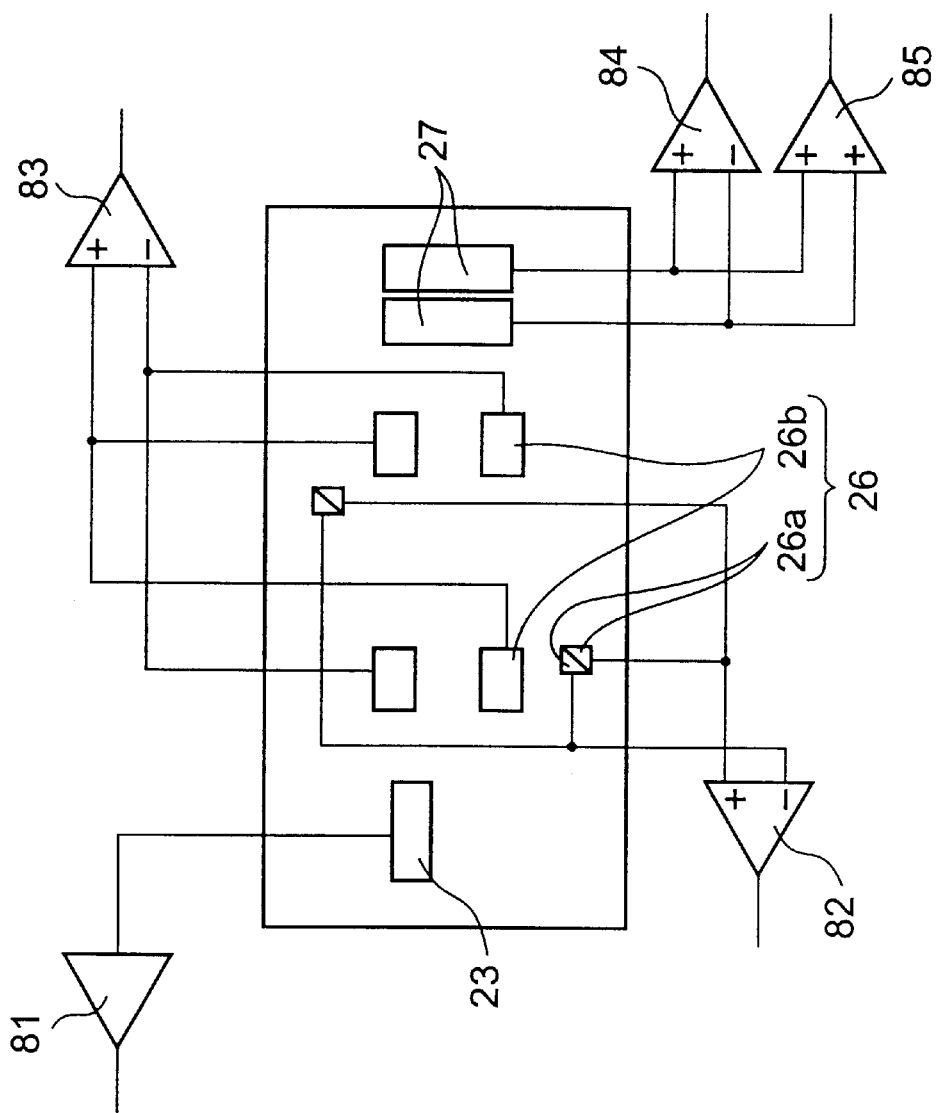
FIG. 9 is a diagram showing a connection structure of a photo detector and a preamplifier circuit.

The light quantity monitoring photo detector 23 shown in FIG. 9 is connected to a light quantity monitoring preamplifier 81, and the light quantity monitoring preamplifier 81 outputs a light quantity monitoring signal in accordance with the light quantity of the light detected by the light quantity monitoring photo detector 23. The outputted light quantity monitoring signal is inputted to the laser output control circuit 510 shown in FIG. 7, and utilized in controlling the laser output.

Moreover, as shown in FIG. 9, as the servo detecting photo detectors 26, there are four focusing detecting photo detectors 26a and four tracking detecting photo detectors 26b. Moreover, four focusing detecting photo detectors 26a are connected to a focusing detecting preamplifier 82, outputs of two focusing detecting photo detectors 26a are added to each other and inputted to the focusing detecting preamplifier 82. Furthermore, a difference between the added outputs is detected by the focusing detecting preamplifier 82 and outputted as a focusing detection signal. Additionally, four tracking detecting photo detectors 26b are connected to a tracking detecting preamplifier 83, outputs of two tracking detecting photo detectors 26b are added to each other and inputted to the tracking detecting preamplifier 83. Moreover, the difference between the added outputs is detected by the tracking detecting preamplifier 83 and outputted as a tracking detection signal. These focusing detection signal and tracking detection signal are inputted to the focus tracking control circuit 520 shown in FIG. 7, and used for focus control and tracking control.

Furthermore, both the signal detecting photo detectors 27 shown in FIG. 9 are connected to an MO detecting preamplifier 84 and an ID detecting preamplifier 85, and the MO detecting preamplifier 84 detects a difference of outputs of two signal detecting photo detectors 27 as an MO detection signal. Moreover, the ID detecting preamplifier 85 detects a sum of outputs of two signal detecting photo detectors 27 as an ID detection signal.

The principle of noise reduction by forming the mask portion 411 shown in FIG. 8 will be described hereinafter. This principle will be hereinafter referred to as a first principle.

Figure 10:
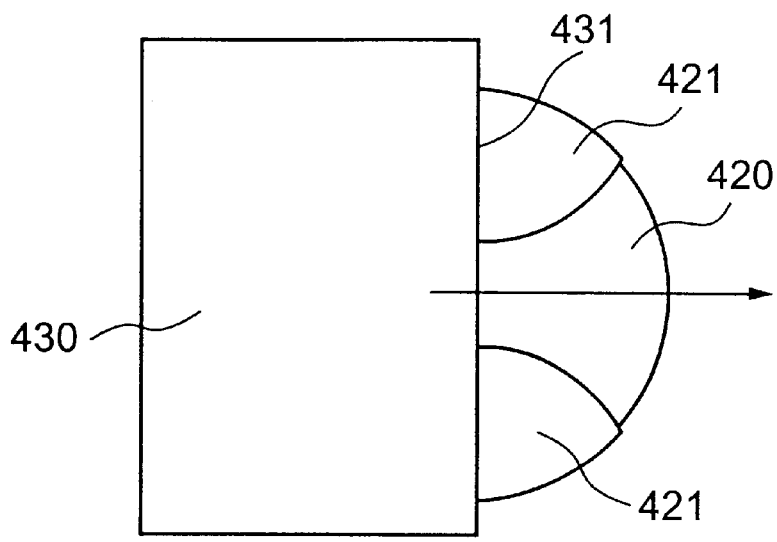
FIG. 10 is a diagram showing that a ball shape is shielded.
Figure 11:
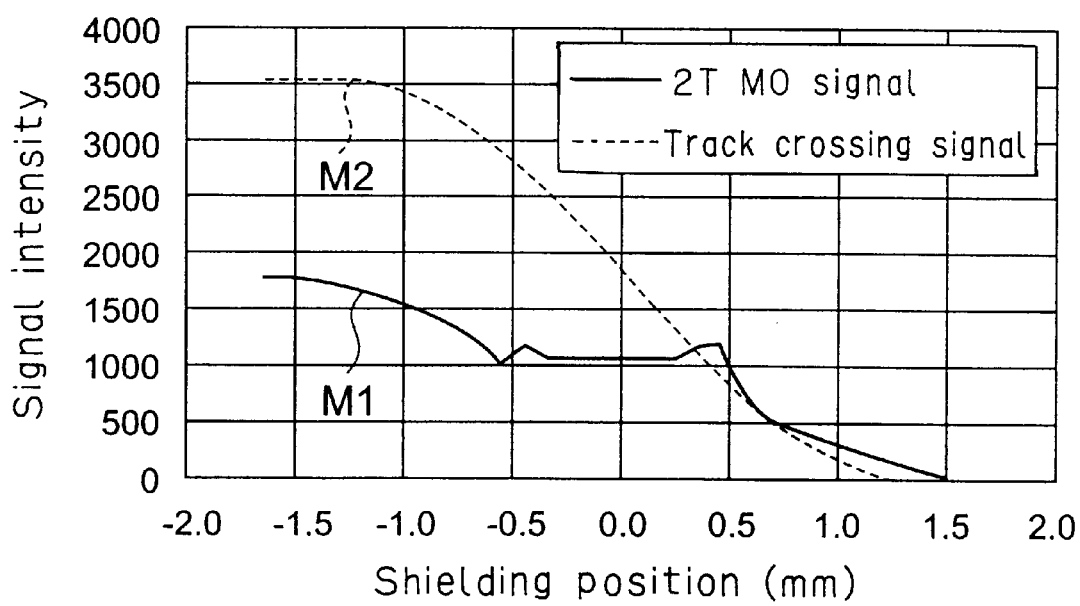
FIG. 11 is a graph showing a relation between a position in which the ball shape is shielded and a signal intensity.

FIG. 10 is a diagram showing that the ball shape is shielded, and FIG. 11 is a graph showing a relation between a position in which the ball shape is shielded and a signal intensity.

FIG. 10 shows that the ball-shaped light 420 provided with two portions 421 including the diffracted light attributed to the track is shielded by a knife edge 430. The knife edge 430 has an edge 431 directed through two portions 421 including the diffracted light. The intensity of the signal of the detected light 420 changes as described later when the knife edge 430 moves in a direction crossing at right angles to the edge 431 (arrow direction of FIG. 10).

The abscissa of the graph of FIG. 11 indicates the position (shielding position) of the edge 431 of the knife edge 430 which shields the ball-shaped light 420, and a ball shape center corresponds to an origin. Moreover, the ordinate of the graph of FIG. 11 indicates the signal intensity.

The graph shows a solid line M1 indicating a relation between the signal intensity of the MO signal S1 of the 2T pattern shown in the graph of FIG. 6 and the shielding position, and a dotted line M2 indicating the relation between the signal intensity of the noise signal S2 and the shielding position when the condensing spot crosses the track. The solid line M1 and dotted line M2 are obtained by calculation under the following conditions.

| | |
|---|---|
| Light source wavelength | 685 nm |
| Objective lens NA | 0.55 |
| Gaussian beam diameter/incident pupil diameter | 0.76 (radial direction) |
| | 0.95 (tangential direction) |
| Medium groove shape | V groove, groove depth |
| corresponding to 1/8λ, land recording | track pitch 1.1 μm |
| Shortest mark length (2T) | 0.50 μm |

The solid line M1 of the graph of FIG. 11 shows a tendency that with an increase of an area of the ball-shaped light 420 shielded by the knife edge 430, the MO signal intensity first decreases, slightly increases in the vicinity of −0.5 mm, then decreases, subsequently changes flat, slightly increases in the vicinity of 0.5 mm again, and then decreases. This means that the portion of the ball-shaped light 420 in the vicinity of the origin hardly contributes to the MO signal.

On the other hand, the dotted line M2 of the graph of FIG. 11 shows that with the increase of the shielded area of the ball-shaped light 420 by the knife edge 430, the noise signal intensity monotonously decreases, and rapidly decreases particularly in the shielding position within ±0.5 mm. This means that the portion of the ball-shaped light 420 in the vicinity of the origin largely contributes to the noise signal.

Therefore, when only the portion of the ball-shaped light 420 in the vicinity of the origin is shielded, the MO signal intensity is maintained, the noise signal intensity decreases, and the SN ratio is enhanced. Moreover, by shielding two places in which with the increase of the shielded area the MO signal intensity slightly increases, the MO signal intensity increases, the noise signal intensity decreases, and the SN ratio is enhanced.

In the optical information storage apparatus and optical device of the present invention, the noise is reduced by the aforementioned first principle.

The method of forming the mask portion 411 shown in FIG. 8, and variation of the mask portion referred to in the present invention will next be described.

Figure 12:
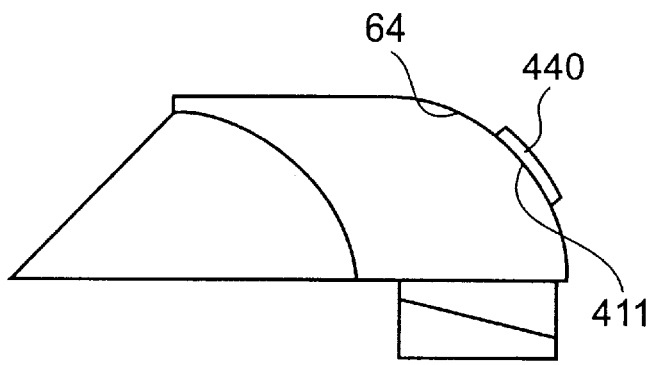
FIG. 12 is a diagram showing one example of a method of forming a mask portion and a first example of the mask portion referred to in the present invention.

FIG. 12 is a diagram showing one example of the method of forming the mask portion and a first example of the mask portion referred to in the present invention.

FIG. 12 shows a part of the constituting component of the optical device 410 shown in FIG. 8, and the constituting component shown in FIG. 12 has a columnar shape in a depth direction of FIG. 12, and can be manufactured in a large amount and inexpensively by cutting a longitudinal material in round pieces as described later.

The mask portion 411 is formed by attaching a light absorbing material 440 to the outside of the optical device of the reflective surface 64 in a predetermined direction in a band shape. By attaching the light absorbing material 440 to the reflective surface 64, in the mask portion 411 the light is transmitted through the reflective surface 64 and absorbed by the light absorbing material 440. Moreover, since the mask portion 411 is formed by attaching the light absorbing material 440 in the band shape, an effect is generated similarly as a case in which a part of the ball shape reaching the reflective surface 64 is shielded as described above. Specifically, since the light reaching the mask portion 411 is substantially shielded.

As a technique of attaching the light absorbing material 440 to the reflective surface 64, a so-called film forming technique represented by vapor deposition, a technique of melting and applying the light absorbing material in a solvent, a technique of placing the tape-like light absorbing material 440 by an adhesive material, and the like are employed in accordance with a property of the light absorbing material 440.

One example of the light absorbing material will be described hereinafter.

| Light absorbing material | Reflectance of S-polarized light | Reflectance of P-polarized light |
| --- | --- | --- |
| Oily ink | 41% | 22% |
| Polyimide tape | 75% | 56% |
| Silicon tape | 67% | 4% |

Here, the reflectance in mask portion 411 is studied with respect to the S-polarized light and P-polarized light when three types of light absorbing materials are attached to the reflective surface 64, respectively, results are shown, and the direction of P polarization is a direction in which the reflective surface 64 has a curvature. Additionally, the reflectance in the main portion is 100% both in S polarization and P polarization.

For the mask portion 411 formed by bonding the silicon tape to the reflective surface 64, the reflectance to the P-polarized light is depressed down to 4%, and the reflectance to the S-polarized light is as high as 67%. Here, under a general optical arrangement in the optical system of the optical information storage apparatus, when the reflectance of P polarization is depressed to be lower than the reflectance of S polarization, an MO signal detection ability is enhanced. Therefore, the mask portion 411 formed by bonding the silicon tape contributes not only to noise reduction but also to enhancement of the signal detection ability.

In the mask portion 411 formed by bonding the polyimide tape to the reflective surface 64, the reflectance of S polarization is 75%, the reflectance of P polarization is 56%, and either reflectance is slightly high. However, the polyimide tape is a material superior in intensity and durability in a high temperature, and contributes to cost reduction of the optical device.

When the mask portion 411 is formed by applying an oily ink to the reflective surface 64, manufacture using an ink jet marker or the like is possible, and manufacture operation controllability or optical device mass productivity is enhanced.

Figure 13:
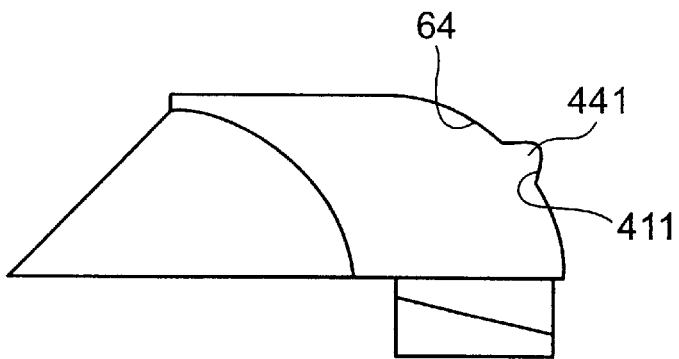
FIG. 13 is a diagram showing a second example of the mask portion referred to in the present invention.

FIG. 13 is a diagram showing a second example of the mask portion referred to in the present invention.

FIG. 13 shows an example in which the mask portion 411 is formed by disposing a protrusion 441 on the reflective surface 64 outside the optical device. When the protrusion 441 is disposed, a total reflection condition collapses, the light is transmitted through the mask portion 411, or the light is reflected in the mask portion 411 in a direction different from the advancing direction of the light reflected by a portion of the reflective surface 64 except the mask portion 411. As a result, for the light flux reaching the reflective surface 64, the light reaching the mask portion 411 is substantially shielded and the noise is reduced by the aforementioned first principle. Moreover, since the protrusion 441 can integrally be formed with the reflective surface 64 by glass molding, a manufacture cost of the optical device or the like is low.

Figure 14:
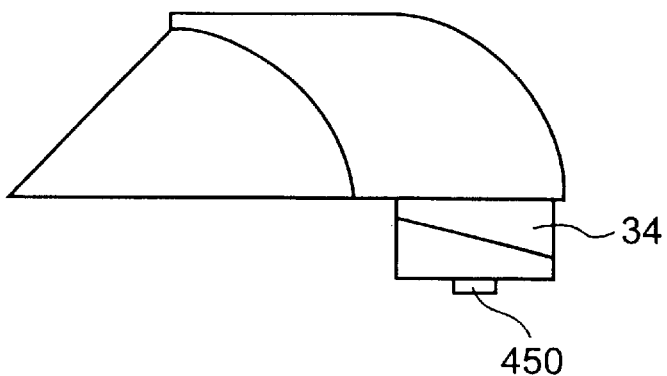
FIG. 14 is an explanatory view of an embodiment provided with a shielding material referred to in the present invention.

FIG. 14 is an explanatory view of an embodiment provided with a shielding material referred to in the present invention.

In the embodiment, a shielding material 450 for shielding a part of the light flux similarly as the mask portion 411 shown in FIG. 8 is attached to the Wollaston prism 34, and by disposing the shielding material 450, the noise is reduced by the first principle.

Figure 15:
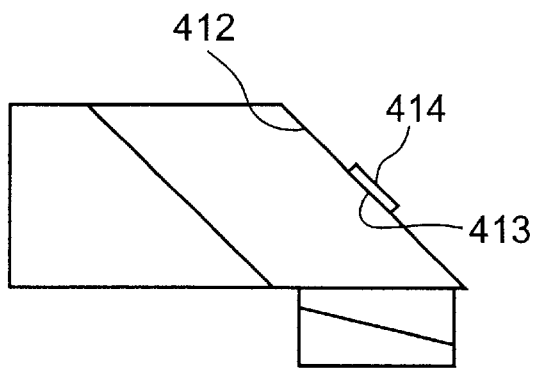
FIG. 15 is a diagram showing a third example of the mask portion referred to in the present invention.

FIG. 15 is a diagram showing a third example of the mask portion referred to in the present invention.

The reflective surface referred to in the present invention may be a plane, and FIG. 15 shows the constituting component of the optical device including a flat reflective surface 412 similar to the reflective surface 32 shown in FIG. 2. A mask portion 413 is also formed on the flat reflective surface 412 in a band shape, and a portion of the reflective surface 412 excluding the mask portion 413 is a main portion. The mask portion 413 is formed by forming a dielectric film 414 on the reflective surface 32 outside the optical device. Moreover, since the dielectric film 414 is formed, a phase difference generated during reflection of the light by the main portion of the reflective surface 412 excluding the mask portion 413 is different from the phase difference generated during reflection of the light by the mask portion 413. Since the phase difference generated in the main portion is designed to be a phase difference suitable for detection of the polarization rotation, for the light reflected by the mask portion 413, the polarization rotation is hardly detected, and the light is substantially shielded by the mask portion 413. As a result, the noise is reduced by the first principle.

Figure 16:
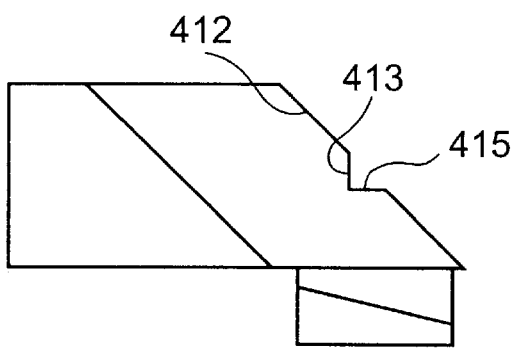
FIG. 16 is a diagram showing a fourth example of the mask portion referred to in the present invention.

FIG. 16 is a diagram showing a fourth example of the mask portion referred to in the present invention.

FIG. 16 shows an example in which the mask portion 413 is formed by disposing a groove 415 in the reflective surface 412 from the outside of the optical device. When the groove 415 is disposed, the total reflection condition collapses, the light is transmitted through the mask portion 413, the light reaching the mask portion 413 is substantially shielded, and the noise is reduced.

Figure 17:
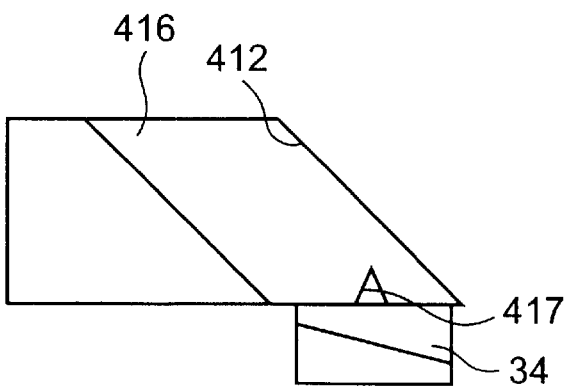
FIG. 17 is an explanatory view of another embodiment provided with the shielding material referred to in the present invention.

FIG. 17 is an explanatory view of another embodiment provided with the shielding material referred to in the present invention.

In the embodiment described with reference to FIG. 17, for a component 416 including the reflective surface 412, a surface to be bonded to the Wollaston prism 34 is provided with a groove 417. This groove 417 is one example of the shielding material referred to in the present invention. When this groove 417 is disposed, the light having reached the groove 417 is reflected or diffracted and substantially shielded, and the noise is reduced.

Figure 18:
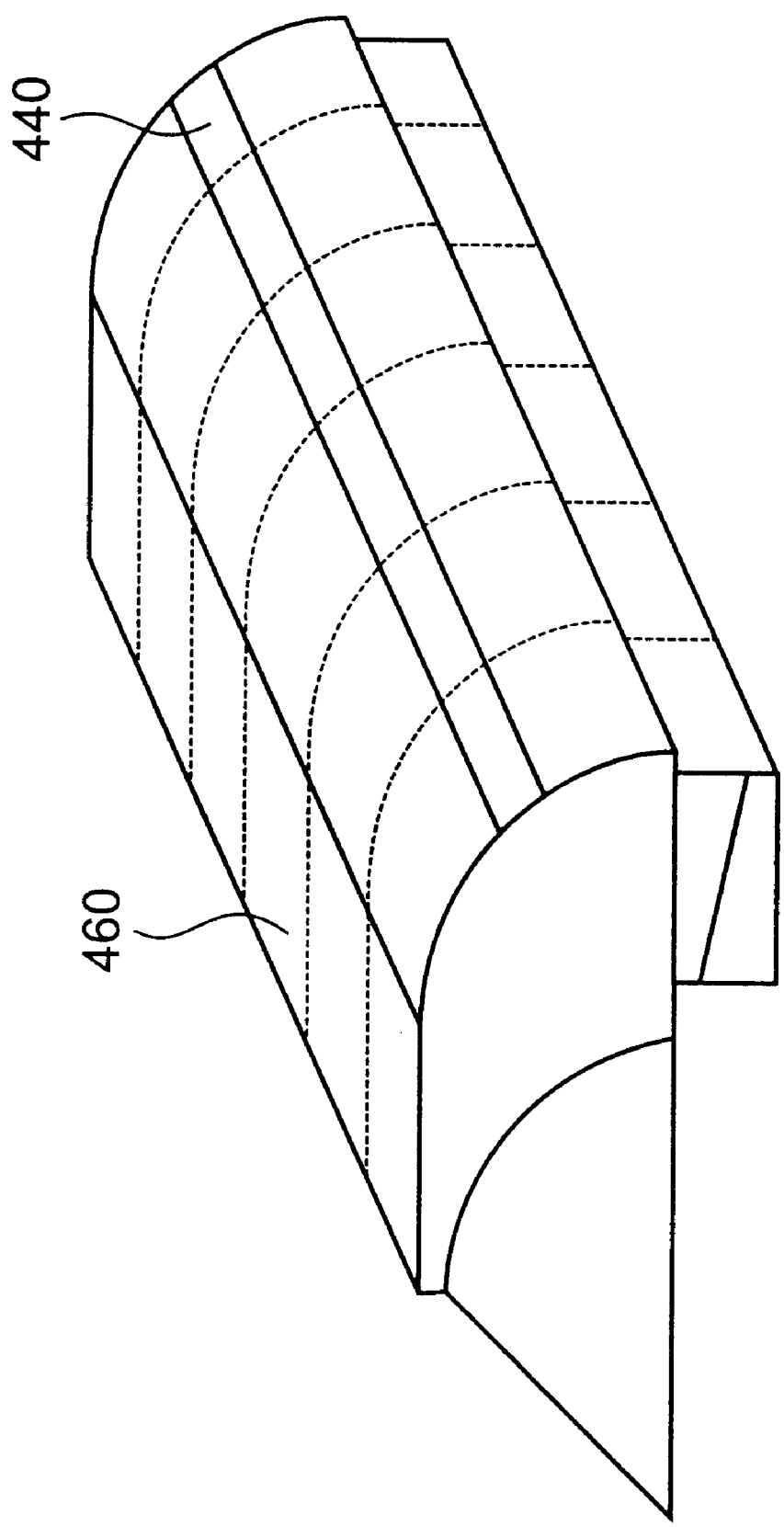
FIG. 18 is an explanatory view of a method of manufacturing the optical device.

FIG. 18 is an explanatory view of a method of manufacturing the optical device 410 shown in FIG. 8.

For the component constituting the optical device 410 shown in FIG. 8, the component having a columnar shape along the predetermined direction is formed by preparing a raw material 460 longitudinal in the predetermined direction by a glass molding process or cutting, and attaching the light absorbing material 440 to the raw material 460 in the band shape by the aforementioned method. Subsequently, the longitudinal raw material 460 is cut into round pieces as shown by dotted lines in FIG. 8. Finally, by placing the servo detecting hologram 33, and the like as shown in FIG. 8, the optical device 410 is manufactured.

According to the manufacture method, the productivity of the optical device 41 is enhanced, and cost reduction by mass production is realized.

Figure 19:
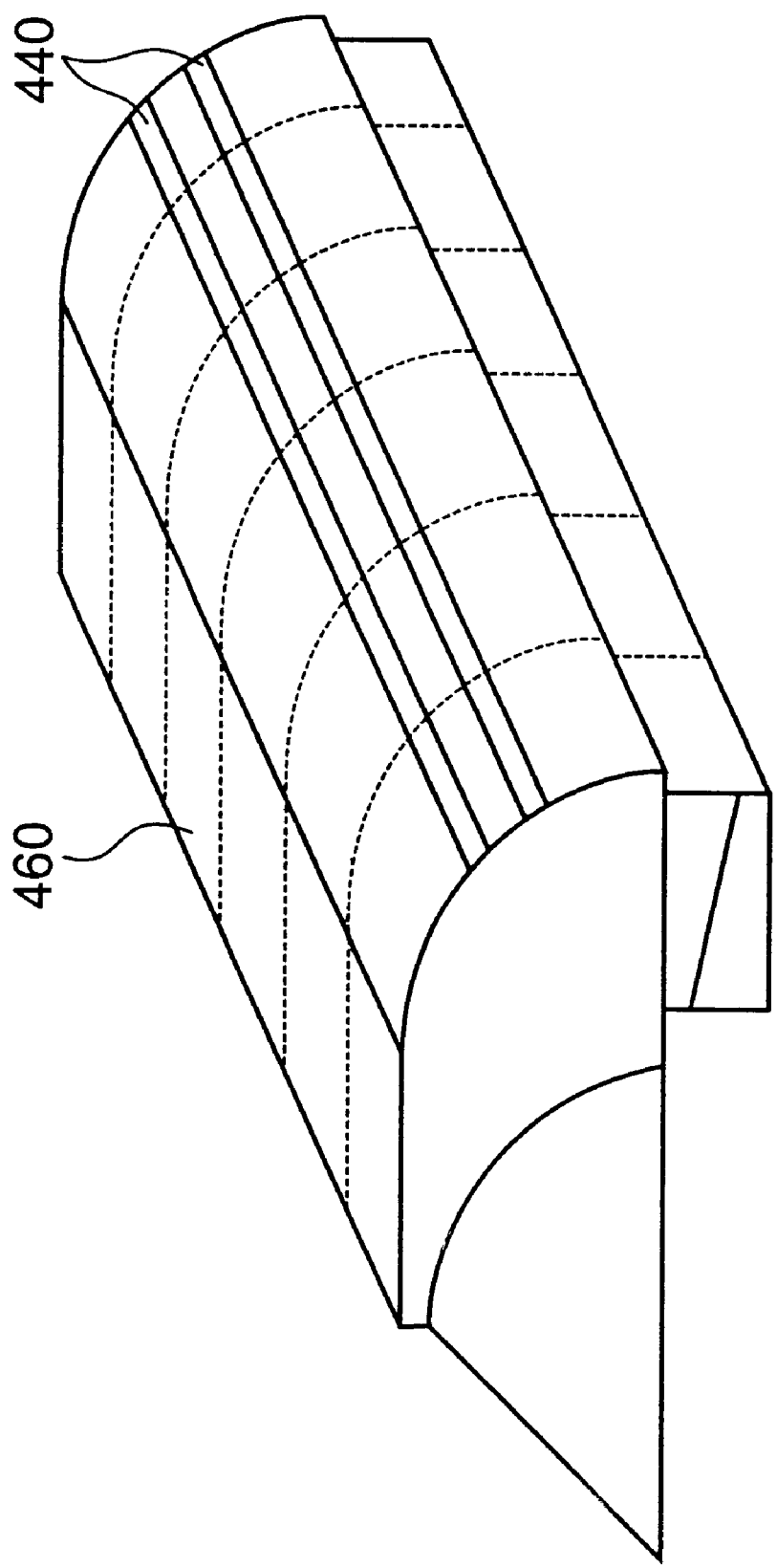
FIG. 19 is a diagram showing a fifth example of the mask portion referred to in the present invention.

FIG. 19 is a diagram showing a fifth example of the mask portion referred to in the present invention.

In the fifth example, the mask portion is formed by attaching the light absorbing material 440 in the form of two bands to the longitudinal raw material 460. By attaching the light absorbing material 440 in this manner, two areas, described with reference to the graph of FIG. 11, in which with the shielding the MO signal intensity slightly increases is substantially shielded, a so-called super-resolution effect is realized, the noise reduction is realized and the MO signal can be strengthened.

In consideration of an optical device attachment margin or a component manufacture margin, it is effective to attach the light absorbing material in the form of one band as shown in FIG. 18. However, when a higher-quality product can be manufactured by enhancing a mounting precision or the like, it is effective to attach the light absorbing material in the form of two bands as shown in FIG. 19.

Figure 20:
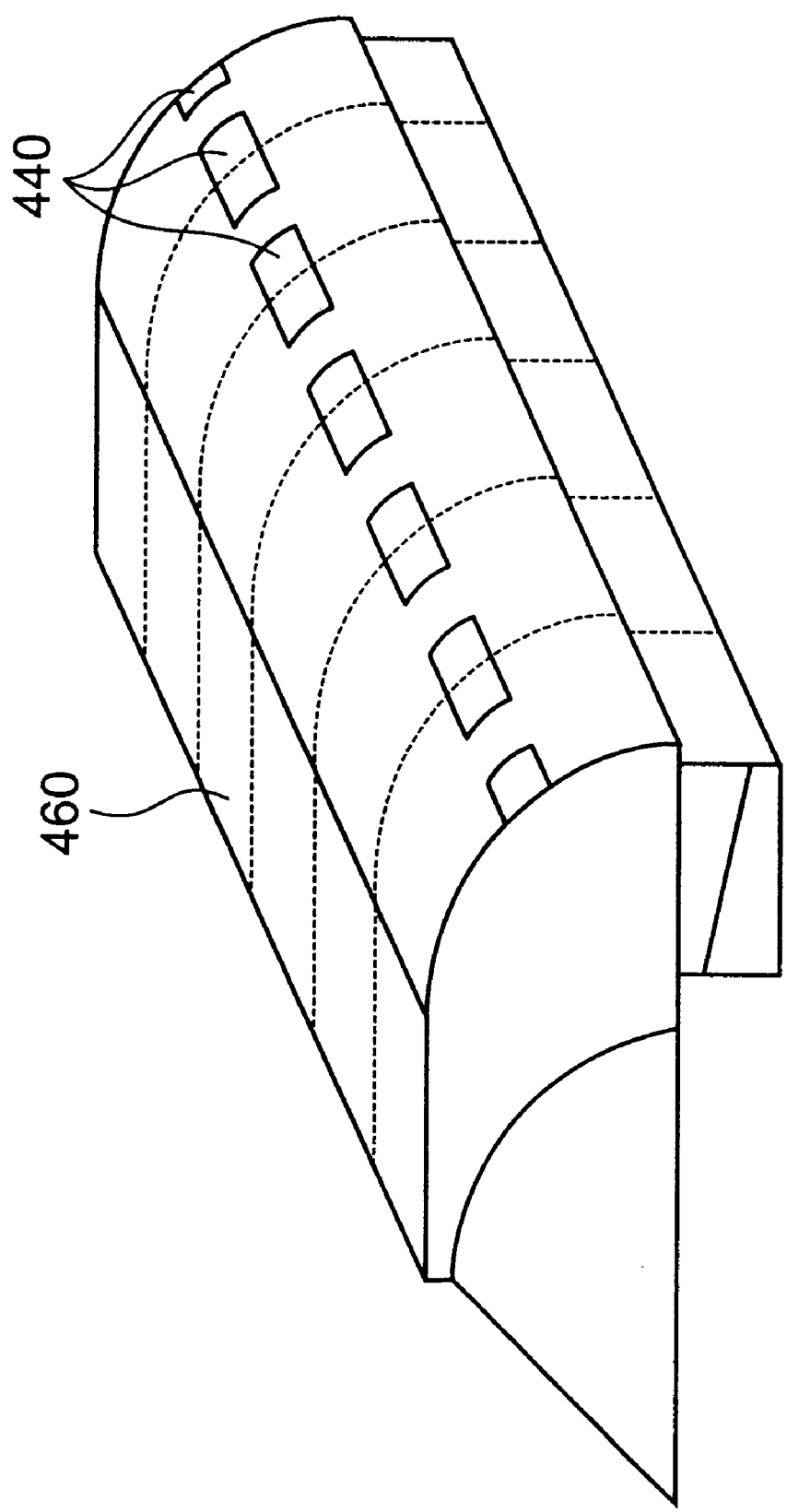
FIG. 20 is a diagram showing a sixth example of the mask portion referred to in the present invention.

FIG. 20 is a diagram showing a sixth example of the mask portion referred to in the present invention.

In the sixth example, the light absorbing material 440 is attached to the longitudinal raw material 460 in an intermittent band shape to form the mask portion, and the raw material 460 is cut into round pieces in such a manner that the light absorbing material 440 attached in the intermittent band shape is divided to two. In the sixth example, for the ball-shaped light 420 shown in FIG. 10, two portions 421 including the diffracted light attributed to the track are substantially shielded. As a result, the noise signal can be removed substantially ideally.

With reference to FIGS. 18 to 20, the light absorbing materials formed in the one-band shape, two-band shape, and intermittent band shape have been described, but similarly, the protrusion shown in FIG. 13 may be formed as one protrusion, two protrusions, or an intermittent protrusion. Moreover, the groove 415 shown in FIG. 16 may be formed as one groove, two grooves, or an intermittent groove.

Figure 21:
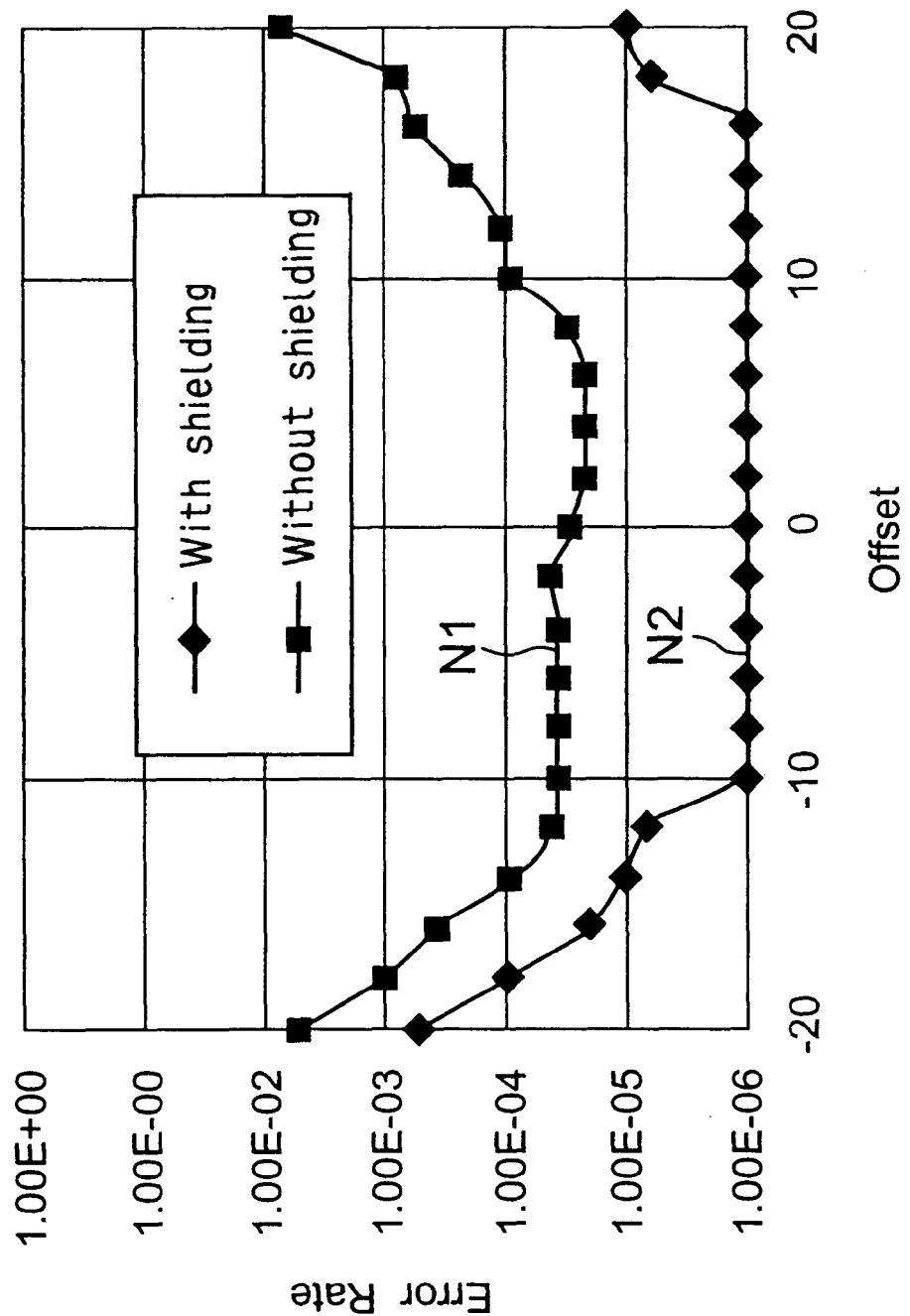
FIG. 21 is a graph showing a comparison result of a signal detection ability of the second comparative example with the signal detection ability of the embodiment of the present invention.

FIG. 21 is a graph showing a comparison result of a signal detection ability of the second comparative example shown in FIG. 3 with the signal detection ability of the embodiment shown in FIGS. 7 and 8.

Here, an experiment was conducted under the following conditions, and the signal detection abilities were compared with each other based on the experiment result. Moreover, a signal detection error ratio was employed as an overall index value of the signal detection ability, a slice level for slicing a signal waveform during signal detection was changed, and an error ratio change in each slice level was measured.

| Writing signal | RLL1-7 modulation random signal shortest mark length 0.64 μm |
| --- | --- |
| Silicon tape width | 0.4 mm (bonded in the vicinity of center light flux) |

The abscissa of FIG. 21 shows an offset value indicating the slice level, and the ordinate shows the signal detection error ratio.

Moreover, FIG. 21 shows a graph N1, provided with squares, for indicating the signal detection ability of the second comparative example shown in FIG. 3, and a graph N2, provided with rhombuses, for indicating the signal detection ability of the embodiment shown in FIGS. 7 and 8.

The error ratio shown by the graph N1 provided with the squares exceeds 1.00E-5 at minimum, while the error ratio shown by the graph N2 provided with the rhombuses indicates a very low error ratio of 1.00E-6 or less in a wide offset range of −10 to +16. Specifically, by placing the silicon tape in the band shape to the position of the mask portion 411 shown in FIG. 8, the error margin is rapidly improved, and realization of a remarkably large error margin has been confirmed. Therefore, the effect of the information reproduction property by the present invention is confirmed as the enhancement of the overall property.

Finally, an embodiment based on a second principle different from the first principle will be described.

Figure 22:
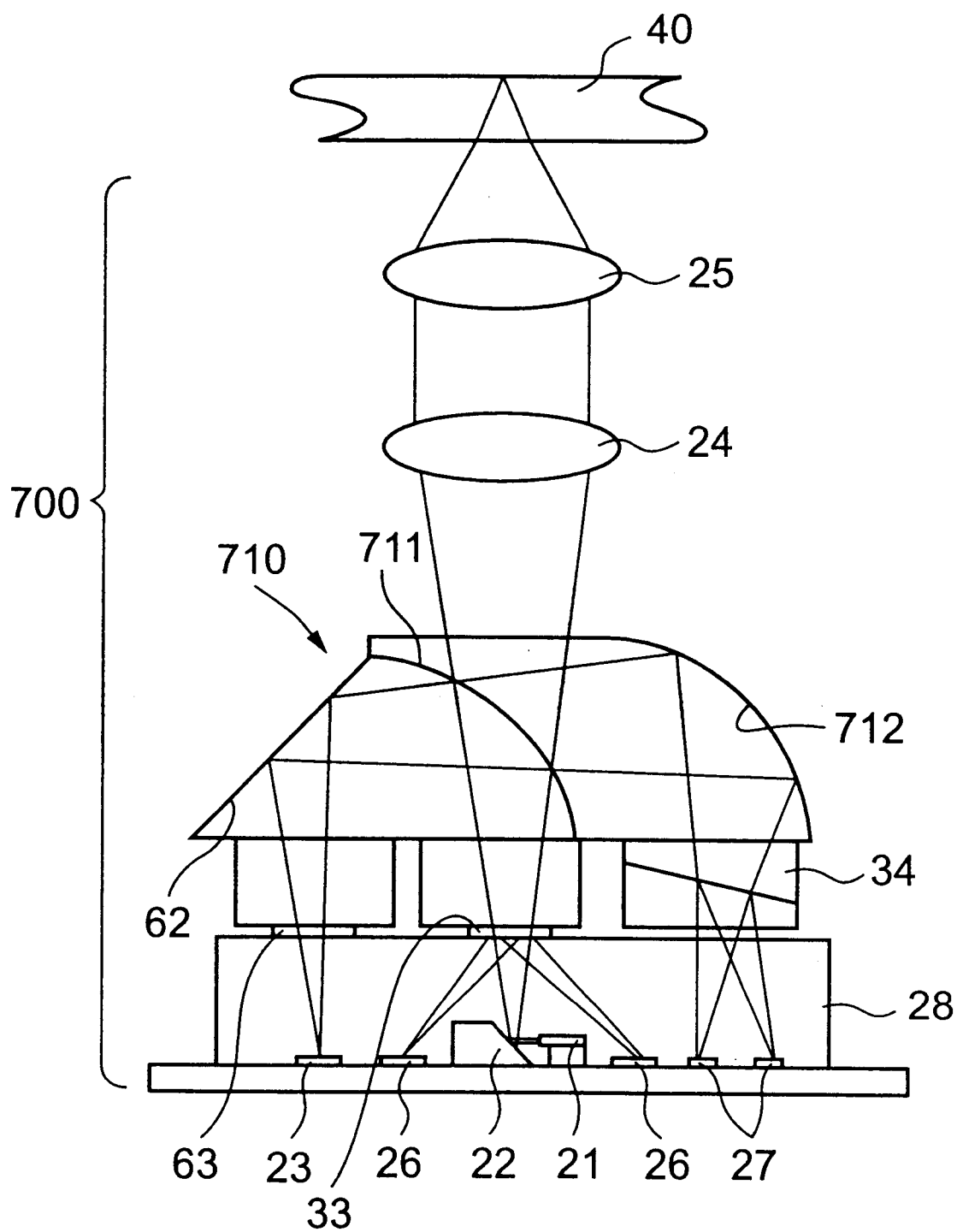
FIG. 22 is a diagram showing an embodiment based on a second principle.

FIG. 22 is a diagram showing the embodiment based on the second principle.

A constitution of the embodiment is similar to the constitution shown in FIG. 7, except that an optical head 700 shown in FIG. 22 is used instead of the optical head 400 shown in FIG. 7. For the components constituting the optical head 700 shown in FIG. 22, the same constituting components as the constituting components of the optical head 400 shown in FIG. 8 are denoted by the same reference numerals, and the description thereof is omitted.

A separation surface 711 and reflective surface 712 of an optical device 710 of the optical head 700 shown in FIG. 22 are designed in such a manner that a light phase difference generated during reflection by the respective surfaces is within ±15° in total, and this respect is the characteristic of this embodiment. Moreover, except this design respect, the separation surface 711 is similar to the separation surface 61 shown in FIG. 8.

In the optical device 710 including the separation surface 711 and reflective surface 712 designed in this manner, the noise is reduced by the second principle described hereinafter.

Figure 23:
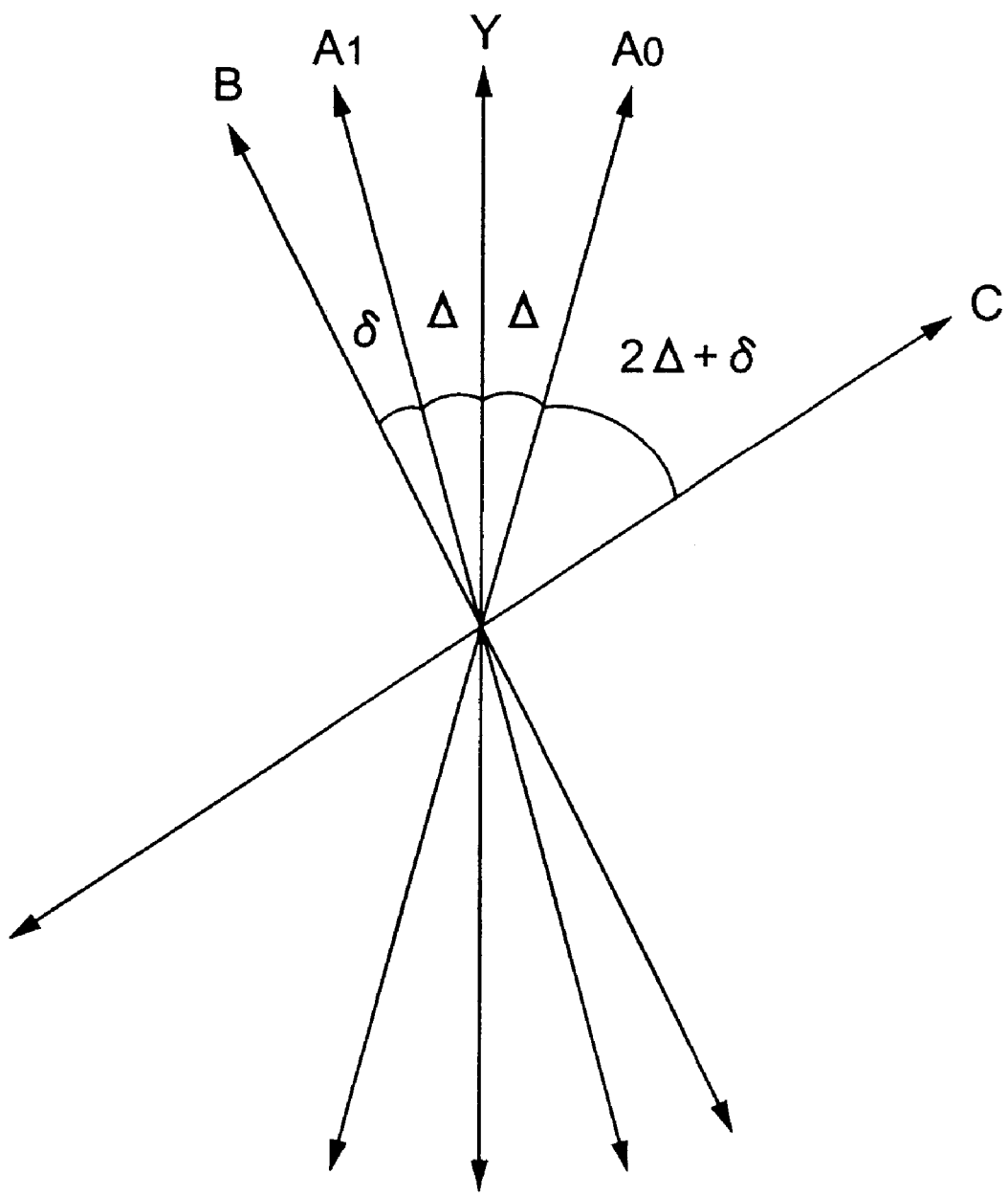
FIG. 23 is an explanatory view of the second principle.

FIG. 23 is an explanatory view of the second principle.

The direction Y shown by an arrow in FIG. 23 is equal to the direction Y shown in FIG. 4, and represents the inherent polarization direction of the light emitted from the light source 71. As described with reference to FIG. 4, in the side area 72b in the section 72 of the emanant light flux, the distribution of the light advancing direction results in rotation of the polarization direction on the separation surface. Also when the emanant light from the laser diode 21 shown in FIG. 22 is transmitted through the separation surface 711, the rotation of the polarization direction similarly occurs. A direction A0 shown by the arrow in FIG. 23 indicates the polarization direction after the light of the side area 72b is transmitted through the separation surface 711, and rotates by angle Δ from the direction Y which is the inherent polarization direction. The light whose polarization direction rotates in this manner is guided to the magnetooptic disk, reflected by the magnetooptic disk and returned. Here, considering the return light along a path in which the light polarized in the direction A0 is directed to the magnetooptic disk, since vertical and horizontal directions of the light flux are reversed by reflection by the magnetooptic disk, the polarization direction of the return light is a direction A1. On the other hand, for the return light, the light polarized in the direction A0 returns along the path in which the light polarized in the direction A0 is directed to the magnetooptic disk. Therefore, so-called P polarization direction of the separation surface 711 to the return light is the direction A0. Specifically, the light whose polarization direction rotates by angle 2Δ from the P polarization direction is incident on the separation surface 711, and by an enlargement action of the polarization rotation by the separation surface 711, the rotation angle 2Δ of the polarization direction is enlarged to angle 2Δ+δ as shown in the following equation.

$$\tan(2\Delta+\delta) = (RS/RP)^{0.5} \times \tan 2\Delta$$

Here, RS denotes a reflectance of the separation surface 711 to a so-called S polarization direction component, and RP denotes the reflectance of the separation surface 711 to a so-called P polarization direction component. Typically, RS is 100%, and RP is of the order of 80%.

As a result of the enlargement of rotation of the polarization direction, the polarization direction of the light reflected by the separation surface 711 is a direction B shown by the arrow of FIG. 23. Moreover, the light polarized in the direction B is incident on the reflective surface 712 shown in FIG. 22, and the light reflected by the reflective surface 712 is incident on the Wollaston prism 34 shown in FIG. 22. Moreover, the Wollaston prism 34 is disposed in such a manner that the direction Y is used as a standard and with inclination of the polarized light in a ±direction the signal intensity increases. Therefore, when the polarization direction of the light reflected by the reflective surface 712 is inclined from the direction Y, the noise by wobbling or the like is enlarged. On the other hand, to enhance an ability to detect the inherent MO signal component, the total of light phase differences generated during reflection in the separation surface 711 and reflective surface 712 is preferably close to 0° or 180°. Then, the polarization direction of the light reflected by the reflective surface 712 will be studied hereinafter with respect to the total phase difference of 0° or 180°.

When the light phase differences generated in the separation surface 711 and reflective surface 712 are 180° in total, the polarization direction of the light reflected by the reflective surface 712 is a direction C shown by the arrow of FIG. 23 by the phase difference. Therefore, the light having reached the Wollaston prism 34 corresponds to the light whose polarization direction has rotated by angle 3Δ+δ with respect to the direction Y as a standard direction.

On the other hand, when the light phase differences generated in the separation surface 711 and reflective surface 712 are 0° in total, the polarization direction of the light reflected by the reflective surface 712 is a direction B. Therefore, the light having reached the Wollaston prism 34 corresponds to the light whose polarization direction has rotated by angle Δ+δ with respect to the direction Y as the standard direction.

Therefore, with the total phase difference of 0°, the noise becomes smaller than that with 180°.

Figure 24:
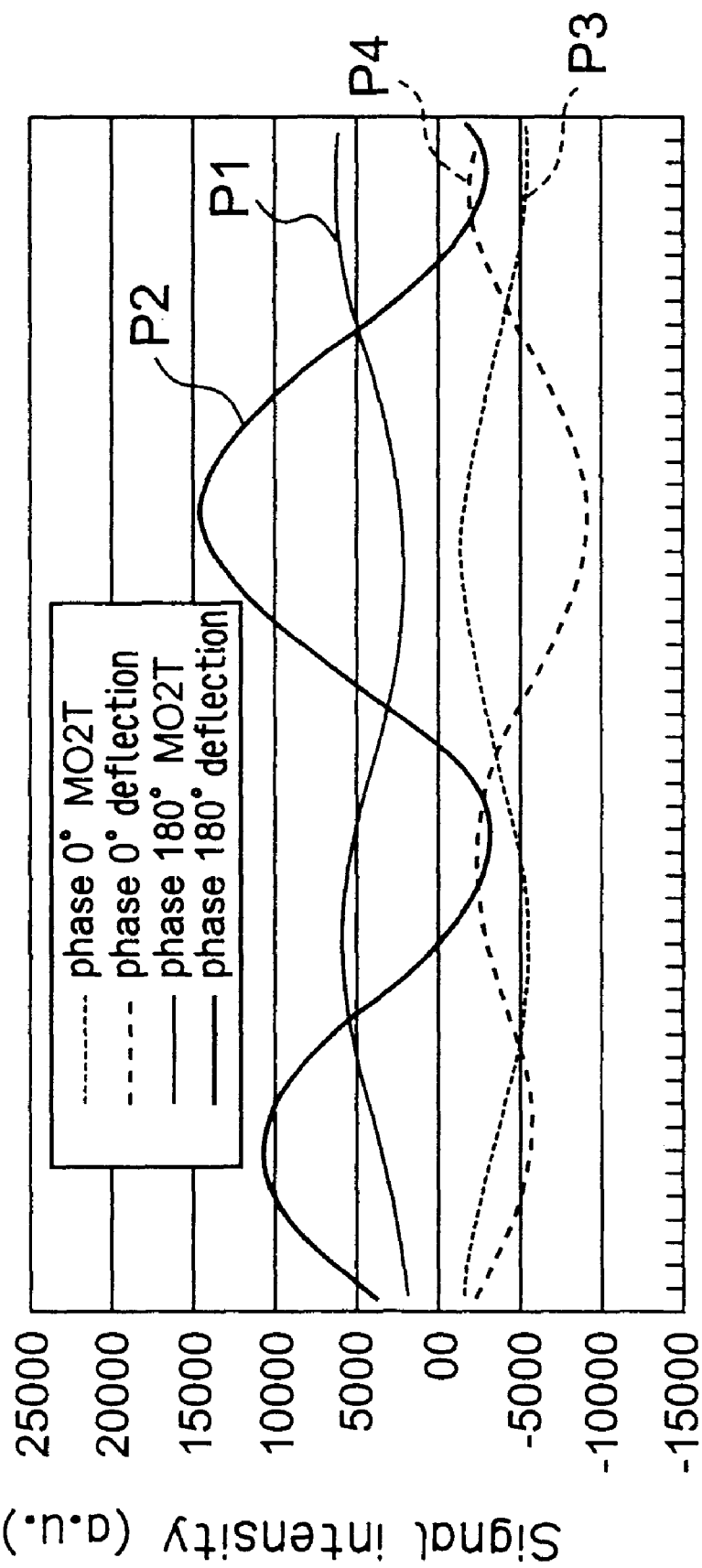
FIG. 24 is a graph showing the MO signal and noise signal when a phase difference is considered.

FIG. 24 is a graph showing the MO signal and noise signal when the phase difference is considered.

The ordinate of the graph indicates the signal intensity obtained by simulation in an arbitrary unit, and the abscissa indicates a movement amount of the condensing spot on the magnetooptic disk. Additionally, the movement amount represents the movement amount in the direction along the track with respect to the MO signal, and represents the movement amount in the direction crossing the track with respect to the noise signal (deflection).

The graph shows a solid line P1 indicating the MO signal intensity when the total of phase differences in the separation surface 711 and reflective surface 712 is 180°, and the condensing spot passes on the recording mark of the 2T pattern, similarly a solid line P2 indicating the noise signal (deflection) intensity when the total of phase differences is 180°, and the condensing spot crosses the track, a dotted line P3 indicating the MO signal intensity of the 2T pattern when the total of phase differences is 0°, and a dotted line P4 indicating the noise signal (deflection) intensity when the total of phase differences is 0°.

The MO signal intensity indicated by the solid line P1, and the MO signal intensity dotted line by the dotted line P3 are mutually reversed in sign, and are the same in a signal absolute value and signal amplitude.

Additionally, during detection of the MO signal, the larger the MO signal amplitude is, the lower the error ratio is. The larger the noise signal (deflection) amplitude is, the higher the error ratio is. Therefore, with the total of phase differences of 180° or 0°, the MO signal amplitude is compared with the noise signal (deflection) amplitude. Then, with the total of phase differences of 180°, the amplitude of the noise signal (deflection) is several times that of the MO signal. On the other hand, with the total of phase differences of 0°, the amplitude of the noise signal (deflection) is about the same as that of the MO signal.

The dotted line P4 shown in FIG. 24 shows the noise signal (deflection) intensity when the condensing spot crosses the track, but the signal intensity actually appearing as the noise depends on a fluctuation of the condensing spot during tracking servo, or a relative fluctuation of the condensing spot to the wobble track. Therefore, when the signal intensity actually appearing as the noise is sufficiently smaller than the MO signal intensity, no trouble occurs in practical use. Then, when a signal ratio is obtained by dividing the noise signal intensity accompanying the fluctuation of the condensing spot by the MO signal intensity with respect to the total value of phase differences in the separation surface and reflective surface, the following values are obtained.

| Phase difference total | Signal ratio |
| --- | --- |
| 0° | 0.3 |
| 180° | 5.2 |

As described above, since with the phase difference total of 0°, the noise is smaller than that with 180°, the total of the phase differences in the separation surface 711 and reflective surface 712 shown in FIG. 22 is preferably close to 0°. Additionally, by the manufacture precision of the optical device or the like, it is difficult to completely set the total of the phase differences to 0°. An allowable range will hereinafter be studied as the total of the phase differences.

The optical information storage medium for actual use is provided with a birefringence property, and the birefringence property also produces a light phase difference Δ1. On the other hand, as described above, a phase difference Δ2 is also generated in the optical system of the optical information storage apparatus.

With the optical information storage medium including a substrate of a polycarbonate material as a most general optical information storage medium, for example, when a substrate thickness is 1.2 mm, by the birefringence property, a phase difference for an optical path difference of several tens of nanometers is generated with respect to a light of a wavelength region from an infrared ray to a visible light, and an angle indicates Δ1=±20°. Moreover, since the phase difference Δ1 and phase difference Δ2 are generated, the signal intensity increases by a factor of cos (Δ1+Δ2).

Here, as a measure by which signal deterioration is allowed, on the basis of 80% of the signal intensity, cos (|Δ1+Δ2|)<cos 36°, then the measure is within Δ2=0°±15°, or within Δ2=180°±15°. On the other hand, considering the influence of the deflection, the phase difference Δ2 is preferably close to 0°, and consequently preferably within Δ2=0°±15°. Moreover, by depressing the total of phase differences in the separation surface 711 and reflective surface 712 within a range of ±15°, it is possible to achieve an object of enhancing the information reproduction ability of the optical information storage apparatus. By further inhibiting the deterioration of the signal property, and using 85% of the signal intensity as the standard, the total of phase differences is preferably within 10°.

Additionally, in the aforementioned respective embodiments, the magnetooptic disk is employed as the optical information storage medium, but the optical information storage medium referred to in the present invention is not limited to the magnetooptic disk, and a phase change type disk or a ROM disk may be used.

As described above, according to the present invention, the noise attributed to the fluctuation of the condensing spot is reduced, and as a result, there can be realized a compact optical information storage apparatus in which high-density recording reproduction is possible.

Furthermore, since the optical device of the present invention can be manufactured in a large amount and inexpensively, the manufacture cost of the optical information storage apparatus is low.

What is claimed is:

1. An optical information storage apparatus comprising:
   a light source for emitting a light;
   an objective optical system for concentrating the light emitted from said light source to an optical information storage medium which generates a return light partially including a signal light in accordance with stored information, and for directing the return light from the optical information storage medium to said light source; and
   an optical device, positioned between said light source and said objective optical system, for guiding the light emitted from said light source to said objective optical system, and separating the signal light from the return light reflected by said optical information storage medium and returned via said objective optical system,
   said optical device comprising:
      a separation surface for transmitting the light emitted from said light source to said objective optical system, and reflecting said signal light to separate the signal light from said return light; and
      a reflective surface including a main portion for reflecting the signal light reflected by said separation surface in a predetermined direction, and a mask portion provided with an optical property different from the optical property of the main portion.

2. An optical information storage apparatus comprising:
   a light source for emitting a light;
   an objective optical system for concentrating the light emitted from said light source to an optical information storage medium which generates a return light partially including a signal light in accordance with stored information, and for directing the return light from the optical information storage medium to said light source; and
   an optical device, positioned between said light source and said objective optical system, for guiding the light emitted from said light source to said objective optical system, and separating the signal light from the return light reflected by said optical information storage medium and returned via said objective optical system,
   said optical device comprising:
      a separation surface for transmitting the light emitted from said light source to said objective optical system, and reflecting said signal light to separate the signal light from said return light;
      a reflective surface for reflecting the signal light reflected by said separation surface in a predetermined direction; and
      a shielding material for shielding a predetermined portion of a flux of the light reflected by said reflective surface.

3. An optical information storage apparatus comprising:
   a light source for emitting a light;
   an objective optical system for concentrating the light emitted from said light source to an optical information storage medium which generates a return light partially including a signal light in accordance with stored information, and for directing the return light from the optical information storage medium to said light source; and
   an optical device, positioned between said light source and said objective optical system, for guiding the light emitted from said light source to said objective optical system, and separating the signal light from the return light reflected by said optical information storage medium and returned via said objective optical system,
   said optical device comprising: a separation surface for transmitting the light emitted from said light source to said objective optical system, and reflecting said signal light to separate the signal light from said return light; and a reflective surface for reflecting the signal light reflected by said separation surface in a predetermined direction, and
   said separation surface and said reflective surface producing a phase difference within ±15° in total as a result of reflection of the light by the separation surface and the reflective surface.

4. An optical device comprising:
   a separation surface for reflecting a light having a predetermined property to separate the light of the predetermined property from a light partially including the light of the predetermined property; and
   a reflective surface for reflecting the light reflected by said separation surface in a predetermined direction,
   said separation surface and said reflective surface produce a phase difference within ±15° in total as a result of reflection of the light by the separation surface and the reflective surface.

* * * * *